US011972884B2

(12) United States Patent
Yoshidome et al.

(10) Patent No.: US 11,972,884 B2
(45) **Date of Patent: *Apr. 30, 2024**

(54) SOFT MAGNETIC ALLOY AND MAGNETIC DEVICE

(71) Applicant: TDK CORPORATION, Tokyo (JP)

(72) Inventors: Kazuhiro Yoshidome, Tokyo (JP); Akihiro Harada, Tokyo (JP); Hiroyuki Matsumoto, Tokyo (JP); Kenji Horino, Tokyo (JP); Akito Hasegawa, Tokyo (JP); Kensuke Ara, Tokyo (JP); Hajime Amano, Tokyo (JP); Masakazu Hosono, Tokyo (JP)

(73) Assignee: TDK CORPORATION, Tokyo (JP)

( * ) Notice: Subject to any disclaimer, the term of this patent is extended or adjusted under 35 U.S.C. 154(b) by 463 days.

This patent is subject to a terminal disclaimer.

(21) Appl. No.: 16/244,633

(22) Filed: Jan. 10, 2019

(65) Prior Publication Data

US 2019/0221342 A1 Jul. 18, 2019

(30) Foreign Application Priority Data

Jan. 12, 2018 (JP) ................................ 2018-003402
Sep. 10, 2018 (JP) ................................ 2018-168792

(51) Int. Cl.
*H01F 1/153* (2006.01)
*C22C 38/42* (2006.01)
(Continued)

(52) U.S. Cl.
CPC ..... *H01F 1/15325* (2013.01); *H01F 1/14741* (2013.01); *H01F 1/15308* (2013.01);
(Continued)

(58) Field of Classification Search
CPC ........... H01F 1/04–086; H01F 1/14–28; H01F 41/0213–0226; C22C 38/00–60; C22C 45/008; C22C 45/02; C21D 6/00–04
See application file for complete search history.

(56) References Cited

U.S. PATENT DOCUMENTS 10,847,292 B2 * 11/2020 Yoshidome ......... H01F 1/15333 148/304
11,145,448 B2 * 10/2021 Hosono ..................... H01F 3/08
(Continued)

FOREIGN PATENT DOCUMENTS

CN 102965597 A 3/2013
EP 2149616 A1 2/2010
(Continued)

OTHER PUBLICATIONS

Chau et al, "The crystallization in Finemet with Cu substituted by Ag," 2004. Journal of Magnetism and Magnetic Materials, vol. 290-291 pp. 1547-1550 (Year: 2004).*
(Continued)

*Primary Examiner* — Anthony M Liang
*Assistant Examiner* — Danny N Kang
(74) *Attorney, Agent, or Firm* — Oliff PLC

(57) ABSTRACT

A soft magnetic alloy includes a main component of $(Fe_{(1-(\alpha+\beta))}X1_{\alpha}X2_{\beta})_{(1-(a+b+c+d+e))}M_aB_bP_cSi_dC_e$. X1 is one or more of Co and Ni. X2 is one or more of Al, Mn, Ag, Zn, Sn, As, Sb, Cu, Cr, Bi, N, O, and rare earth elements. M is one or more of Nb, Hf, Zr, Ta, Mo, W, and V. $0.020 \leq a \leq 0.14$ is satisfied. $0.020 < b \leq 0.20$ is satisfied. $0 \leq d \leq 0.060$ is satisfied. $\alpha \geq 0$ is satisfied. $\beta \geq 0$ is satisfied. $0 \leq \alpha+\beta \leq 0.50$ is satisfied. c and e are within a predetermined range. The soft magnetic alloy has a nanohetero structure or a structure of Fe based nanocrystallines.

3 Claims, 2 Drawing Sheets

(51) Int. Cl.
*C22C 45/02* (2006.01)
*H01F 1/147* (2006.01)
*H01F 41/02* (2006.01)

(52) U.S. Cl.
CPC ..... *H01F 1/15333* (2013.01); *H01F 41/0226* (2013.01); *H01F 41/0246* (2013.01); *C22C 38/42* (2013.01); *C22C 45/02* (2013.01)

(56) References Cited

U.S. PATENT DOCUMENTS

2010/0043927 A1* 2/2010 Makino .................. C22C 38/12 148/612
2010/0097171 A1* 4/2010 Urata .................... C21D 6/007 420/83
2013/0314198 A1* 11/2013 Yoshizawa ............... H01F 3/04 148/306
2019/0279799 A1* 9/2019 Hosono .................... H01F 1/24 428/570
2019/0355498 A1* 11/2019 Yoshidome ......... H01F 1/14741
2020/0216926 A1* 7/2020 Ito ............................ C21D 9/52

FOREIGN PATENT DOCUMENTS

JP 3342767 B2 11/2002
JP 2013-185162 A 9/2013
TW 2004-13546 A 8/2004

OTHER PUBLICATIONS

Chau et al, "The effect of Zn, Ag and Au substitution for Cu in Finemet on the crystallization and magnetic properties," 2006. Journal of Magnetism and Magnetic Materials, vol. 303, No. 2, pp. 415-418 (Year: 2006).*

* cited by examiner

SOFT MAGNETIC ALLOY AND MAGNETIC DEVICE

BACKGROUND OF THE INVENTION

The present invention relates to a soft magnetic alloy and a magnetic device.

Low power consumption and high efficiency have been demanded in electronic, information, communication equipment, and the like. Moreover, the above demands are becoming stronger for a low carbon society. Thus, reduction in energy loss and improvement in power supply efficiency are also required for power supply circuits of electronic, information, communication equipment, and the like. Then, improvement in saturation magnetic flux density and permeability and reduction in core loss (magnetic core loss) are required for the magnetic core of the magnetic element used in the power supply circuit. The reduction in core loss reduces the loss of power energy, and the improvement in permeability downsizes a magnetic element. Thus, high efficiency and energy saving are achieved.

Patent Document 1 discloses a Fe—B-M based soft magnetic amorphous alloy (M=Ti, Zr, Hf, V, Nb, Ta, Mo, and W). This soft magnetic amorphous alloy has favorable soft magnetic properties, such as a high saturation magnetic flux density, compared to a saturation magnetic flux density of a commercially available Fe based amorphous material.

Patent Document 1: JP3342767 (B2)

BRIEF SUMMARY OF INVENTION

As a method of reducing the core loss of the magnetic core, it is conceivable to reduce coercivity of a magnetic material constituting the magnetic core.

Patent Document 1 discloses that soft magnetic characteristics can be improved by depositing fine crystal phases in the Fe based soft magnetic alloy. At present, however, required is a soft magnetic alloy having high soft magnetic characteristics and being capable of maintaining a high permeability to a higher frequency.

It is an object of the invention to provide a soft magnetic alloy having high resistivity and saturation magnetic flux density and a low coercivity and being capable of maintaining a high permeability to a higher frequency.

To achieve the above object, a soft magnetic alloy according to the first aspect of the present invention includes a main component of $(Fe_{(1-(\alpha+\beta))}X1_{\alpha}X2_{\beta})_{(1-(a+b+c+d+e))}M_aB_bP_cSi_dC_e$, in which X1 is one or more of Co and Ni, X2 is one or more of Al, Mn, Ag, Zn, Sn, As, Sb, Cu, Cr, Bi, N, O, and rare earth elements, M is one or more of Nb, Hf, Zr, Ta, Mo, W, and V, $0.020 \leq a \leq 0.14$ is satisfied, $0.020 < b \leq 0.20$ is satisfied, $0.040 < c \leq 0.15$ is satisfied, $0 \leq d \leq 0.060$ is satisfied, $0 \leq e \leq 0.030$ is satisfied, $\alpha \geq 0$ is satisfied, $\beta \geq 0$ is satisfied, and $0 \leq \alpha+\beta \leq 0.50$ is satisfied, wherein the soft magnetic alloy has a nanohetero structure where initial fine crystals exist in an amorphous phase.

To achieve the above object, a soft magnetic alloy according to the second aspect of the present invention includes a main component of $(Fe_{(1-(\alpha+\beta))}X1_{\alpha}X2_{\beta})_{(1-(a+b+c+d+e))}M_aB_bP_cSi_dC_e$, in which X1 is one or more of Co and Ni, X2 is one or more of Al, Mn, Ag, Zn, Sn, As, Sb, Cu, Cr, Bi, N, O, and rare earth elements, M is one or more of Nb, Hf, Zr, Ta, Mo, W, and V, $0.020 \leq a \leq 0.14$ is satisfied, $0.020 < b \leq 0.20$ is satisfied, $0 < c \leq 0.040$ is satisfied, $0 \leq d \leq 0.060$ is satisfied, $0.0005 < e < 0.0050$ is satisfied, $\alpha \geq 0$ is satisfied, $\beta \geq 0$ is satisfied, and $0 \leq \alpha+\beta \leq 0.50$ is satisfied, wherein the soft magnetic alloy has a nanohetero structure where initial fine crystals exist in an amorphous phase.

In the soft magnetic alloy according to the first and second aspects of the present invention, the initial fine crystals may have an average grain size of 0.3 to 10 nm.

To achieve the above object, a soft magnetic alloy according to the third aspect of the present invention includes a main component of $(Fe_{(1-(\alpha+\beta))}X1_{\alpha}X2_{\beta})_{(1-(a+b+c+d+e))}M_aB_bP_cSi_dC_e$, in which X1 is one or more of Co and Ni, X2 is one or more of Al, Mn, Ag, Zn, Sn, As, Sb, Cu, Cr, Bi, N, O, and rare earth elements, M is one or more of Nb, Hf, Zr, Ta, Mo, W, and V, $0.020 \leq a \leq 0.14$ is satisfied, $0.020 < b \leq 0.20$ is satisfied, $0.040 < c \leq 0.15$ is satisfied, $0 \leq d \leq 0.060$ is satisfied, $0 \leq e \leq 0.030$ is satisfied, $\alpha \geq 0$ is satisfied, $\beta \geq 0$ is satisfied, and $0 \leq \alpha+\beta \leq 0.5$ is satisfied, wherein the soft magnetic alloy has a structure of Fe based nanocrystallines.

To achieve the above object, a soft magnetic alloy according to the fourth aspect of the present invention includes a main component of $(Fe_{(1-(\alpha+\beta))}X1_{\alpha}X2_{\beta})_{(1-(a+b+c+d+e))}M_aB_bP_cSi_dC_e$, in which X1 is one or more of Co and Ni, X2 is one or more of Al, Mn, Ag, Zn, Sn, As, Sb, Cu, Cr, Bi, N, O, and rare earth elements, M is one or more of Nb, Hf, Zr, Ta, Mo, W, and V, $0.020 \leq a \leq 0.14$ is satisfied, $0.020 < b \leq 0.20$ is satisfied, $0 < c \leq 0.040$ is satisfied, $0 \leq d \leq 0.060$ is satisfied, $0.0005 < e < 0.0050$ is satisfied, $\alpha \geq 0$ is satisfied, $\beta \geq 0$ is satisfied, and $0 \leq \alpha+\beta \leq 0.50$ is satisfied, wherein the soft magnetic alloy has a structure of Fe based nanocrystallines.

In the soft magnetic alloy according to the third and fourth aspects of the present invention, the Fe based nanocrystallines may have an average grain size of 5 to 30 nm.

Since the soft magnetic alloy according to the first aspect of the present invention has the above features, the soft magnetic alloy according to the third aspect of the present invention is easily obtained by heat treatment. Since the soft magnetic alloy according to the second aspect of the present invention has the above features, the soft magnetic alloy according to the fourth aspect of the present invention is easily obtained by heat treatment. In the soft magnetic alloy according to the third aspect and the soft magnetic alloy according to the fourth aspect, a high resistivity, a high saturation magnetic flux density, and a low coercivity can be achieved at the same time, and a higher permeability μ' can be maintained to a higher frequency. Incidentally, μ' is a real part of a complex permeability.

The following description regarding the soft magnetic alloys according to the present invention is common among the first to fourth aspects.

In the soft magnetic alloys according to the present invention, $0.73 \leq 1-(a+b+c+d+e) \leq 0.95$ may be satisfied.

In the soft magnetic alloys according to the present invention, $0 \leq \alpha\{1-(a+b+c+d+e)\} \leq 0.40$ may be satisfied.

In the soft magnetic alloys according to the present invention, $\alpha=0$ may be satisfied.

In the soft magnetic alloys according to the present invention, $0 \leq \beta\{1-(a+b+c+d+e)\} \leq 0.030$ may be satisfied.

In the soft magnetic alloys according to the present invention, $\beta=0$ may be satisfied.

In the soft magnetic alloys according to the present invention, $\alpha=\beta=0$ may be satisfied.

The soft magnetic alloys according to the present invention may have a ribbon shape.

The soft magnetic alloys according to the present invention may have a powder shape.

A magnetic device according to the present invention contains the above-mentioned soft magnetic alloy.

DETAILED DESCRIPTION OF INVENTION

Figure 1:
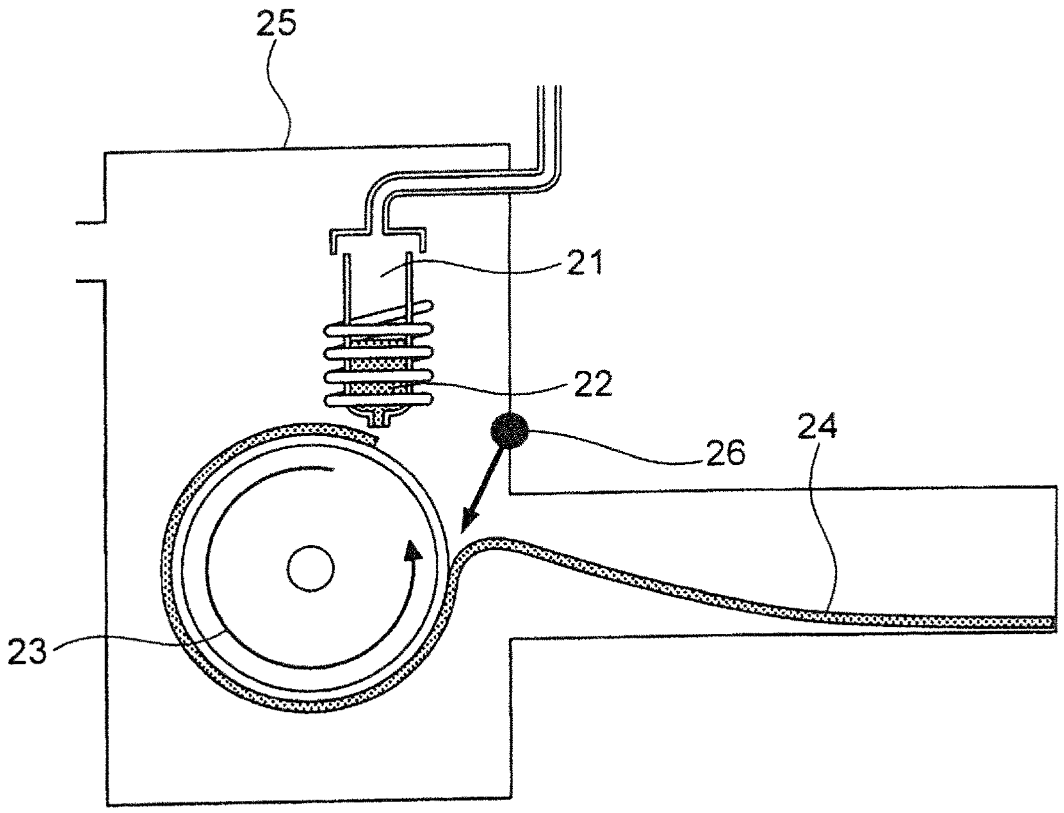
FIG. 1 is a schematic view of a single roller method.

Hereinafter, First Embodiment to Fifth Embodiment of the present invention are explained.

First Embodiment

A soft magnetic alloy according to the present embodiment includes a main component of $(Fe_{(1-(\alpha+\beta))}X1_{\alpha}X2_{\beta})_{(1-(a+b+c+d+e))}M_aB_bP_cSi_dC_e$, in which X1 is one or more of Co and Ni, X2 is one or more of Al, Mn, Ag, Zn, Sn, As, Sb, Cu, Cr, Bi, N, O, and rare earth elements, M is one or more of Nb, Hf, Zr, Ta, Mo, W, and V, $0.020 \leq a \leq 0.14$ is satisfied, $0.020 < b \leq 0.20$ is satisfied, $0.040 < c \leq 0.15$ is satisfied, $0 \leq d \leq 0.060$ is satisfied, $0 \leq e \leq 0.030$ is satisfied, $\alpha \geq 0$ is satisfied, $\beta \geq 0$ is satisfied, and $0 \leq \alpha+\beta \leq 0.50$ is satisfied, wherein the soft magnetic alloy has a nanohetero structure where initial fine crystals exist in an amorphous phase.

When the above-mentioned soft magnetic alloy (a soft magnetic alloy according to the first aspect of the present invention) undergoes a heat treatment, Fe based nanocrystallines are easily deposited in the soft magnetic alloy. In other words, the above-mentioned soft magnetic alloy easily becomes a starting raw material of a soft magnetic alloy where Fe based nanocrystallines are deposited (a soft magnetic alloy according to the third aspect of the present invention). Incidentally, the initial fine crystals preferably have an average grain size of 0.3 to 10 nm.

The soft magnetic alloy according to the third aspect of the present invention includes the same main component as the soft magnetic alloy according to the first aspect and a structure of Fe based nanocrystallines.

The Fe based nanocrystallines are crystals whose grain size is nano-order and whose crystal structure of Fe is bcc (body-centered cubic). In the present embodiment, it is preferable to deposit Fe based nanocrystallines having an average grain size of 5 to 30 nm. The soft magnetic alloy where Fe based nanocrystallines are deposited is easy to have a high saturation magnetic flux density and a low coercivity.

Hereinafter, each component of the soft magnetic alloy according to the present embodiment is explained in detail.

M is one or more of Nb, Hf, Zr, Ta, Mo, W, and V.

The M content (a) satisfies $0.020 \leq a \leq 0.14$. The M content (a) is preferably $0.040 \leq a \leq 0.10$, more preferably $0.050 \leq a \leq 0.080$. When the M content (a) is small, a crystal phase composed of crystals having a grain size of larger than 30 nm is easily generated in the soft magnetic alloy. When the crystal phase is generated, Fe based nanocrystallines cannot be deposited by heat treatment, and the soft magnetic alloy easily has a low resistivity, a high coercivity, and a low permeability μ'. When the M content (a) is large, the soft magnetic alloy easily has a low saturation magnetic flux density.

The B content (b) satisfies $0.020 < b \leq 0.20$. The B content (b) may be $0.025 \leq b \leq 0.20$ and is preferably $0.060 \leq b \leq 0.15$, more preferably $0.080 \leq b \leq 0.12$. When the B content (b) is small, a crystal phase composed of crystals having a grain size of larger than 30 nm is easily generated in the soft magnetic alloy. When the crystal phase is generated, Fe based nanocrystallines cannot be deposited by heat treatment, and the soft magnetic alloy easily has a low resistivity, a high coercivity, and a low permeability μ'. When the B content (b) is large, the soft magnetic alloy easily has a low saturation magnetic flux density.

The P content (c) satisfies $0.040 < c \leq 0.15$. The P content (c) may be $0.041 \leq c \leq 0.15$ and is preferably $0.045 \leq c \leq 0.10$, more preferably $0.050 \leq c \leq 0.070$. When the P content (c) is in the above range, especially in the range of $c > 0.040$, the soft magnetic alloy has an improved resistivity and a low coercivity. Moreover, when the soft magnetic alloy has an improved resistivity, a high permeability μ' can be maintained to a higher frequency. When the P content (c) is small, the above effects are hard to be obtained. When the P content (c) is large, the soft magnetic alloy easily has a low saturation magnetic flux density.

The Si content (d) satisfies $0 \leq d \leq 0.060$. That is, Si may not be contained. The Si content (d) is preferably $0.005 \leq d \leq 0.030$, more preferably $0.0104 \leq d \leq 0.020$. When the soft magnetic alloy contains Si, resistivity is particularly easily improved, and coercivity is easily decreased. Moreover, when the soft magnetic alloy has an improved resistivity, a high permeability μ' can be maintained to a high frequency. When the Si content (d) is large, the soft magnetic alloy has an increased coercivity on the contrary.

The C content (e) satisfies $0 \leq e \leq 0.030$. That is, C may not be contained. The C content (e) is preferably $0.001 \leq e \leq 0.010$, more preferably $0.001 \leq e \leq 0.005$. When the soft magnetic alloy contains C, coercivity is particularly easily decreased, and coercivity is easily decreased. When the C content (e) is large, the soft magnetic alloy has a low resistivity and has an increased coercivity on the contrary, and a high permeability μ' is hard to be maintained to a high frequency.

The Fe content $(1-(a+b+c+d+e))$ is not limited, but is preferably $0.73 \leq (1-(a+b+c+d+e)) \leq 0.95$. When the Fe content $(1-(a+b+c+d+e))$ is in the above range, a crystal phase composed of crystals having a grain size of larger than 30 nm is hard to be generated, and it thereby becomes easy to obtain a soft magnetic alloy where Fe based nanocrystallines are deposited.

In the soft magnetic alloy according to the present embodiment, a part of Fe may be substituted by X1 and/or X2.

X1 is one or more of Co and Ni. The X1 content may be $\alpha$=0. That is, X1 may not be contained. Preferably, the number of atoms of X1 is 40 at % or less if the number of atoms of the entire composition is 100 at %. That is, $0 \leq \alpha\{1-(a+b+c+d+e)\} \leq 0.40$ is preferably satisfied.

X2 is one or more of Al, Mn, Ag, Zn, Sn, As, Sb, Cu, Cr, Bi, N, O, and rare earth elements. The content X2 may be $\beta$=0. That is, X2 may not be contained. Preferably, the number of atoms of X2 is 3.0 at % or less if the number of atoms of the entire composition is 100 at %. That is, $0 \leq \beta\{1-(a+b+c+d+e)\} \leq 0.030$ is preferably satisfied.

The substitution amount of Fe by X1 and/or X2 is half or less of Fe based on the number of atoms. That is, $0 \leq \alpha+\beta \leq 0.50$ is satisfied. When $\alpha+\beta > 0.50$ is satisfied, the soft magnetic alloy according to the third aspect of the present invention is hard to be obtained by heat treatment.

Incidentally, the soft magnetic alloys of the present embodiment may contain elements other than the above-mentioned elements as unavoidable impurities. For example, 0.1 wt % or less of unavoidable impurities may be contained with respect to 100 wt % of the soft magnetic alloy.

Hereinafter, a method of manufacturing the soft magnetic alloy is explained.

The soft magnetic alloy is manufactured by any method. For example, a ribbon of the soft magnetic alloy is manufactured by a single roller method. The ribbon may be a continuous ribbon.

In the single roller method, pure metals of respective metal elements contained in a soft magnetic alloy finally obtained are initially prepared and weighed so that a composition identical to that of the soft magnetic alloy finally obtained is obtained. Then, the pure metal of each metal element is melted and mixed, and a base alloy is prepared. Incidentally, the pure metals are melted by any method. For example, the pure metals are melted by high-frequency heating after a chamber is evacuated. Incidentally, the base alloy and the soft magnetic alloy finally obtained normally have the same composition.

Next, the prepared base alloy is heated and melted, and a molten metal is obtained. The molten metal has any temperature, and may have a temperature of 1200 to 1500° C., for example.

FIG. 1 is a schematic view of an apparatus used for a single roller method according to the present embodiment. In the single roller method according to the present embodiment, a molten metal 22 is sprayed and supplied from a nozzle 21 against a roller 23 rotating in the arrow direction, and a ribbon 24 is thereby manufactured in the rotating direction of the roller 23 in a chamber 25. Incidentally, the roller 23 is made by any material, such as Cu, in the present embodiment.

Figure 2:
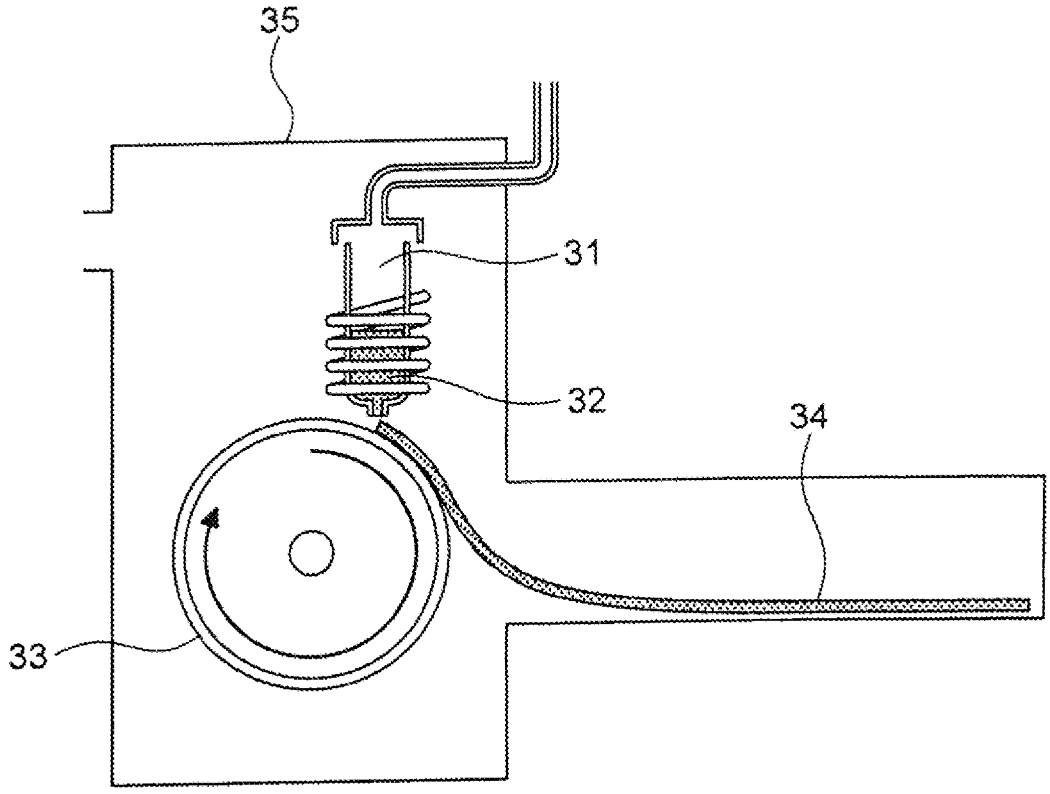
FIG. 2 (RELATED ART)
FIG. 2 is a schematic view of a single roller method.

On the other hand, FIG. 2 is a schematic view of an apparatus used for a normally employed single roller method. In a chamber 35, a molten metal 32 is sprayed and supplied from a nozzle 31 against a roller 33 rotating in the arrow direction, and a ribbon 34 is manufactured in the rotating direction of the roller 33.

In the single roller method, it is conventionally considered that a molten metal is preferably cooled rapidly by increasing a cooling rate, that the cooling rate is preferably increased by increasing a contact time between the molten metal and a roller and by increasing a temperature difference between the molten metal and the roller, and that the roller thereby preferably normally has a temperature of about 5 to 30° C.

The present inventors can achieve a rapid cooling of the ribbon 24 even if the roller 23 has a high temperature of about 50 to 70° C. by rotating the roller 23 in the opposite direction (see FIG. 1) to the normal direction so as to further increase a contact time between the roller 23 and the ribbon 24. In order to rotate the roller 23 in the opposite direction to the normal direction, it is necessary to peel the roller 23 and the ribbon 24 by ejecting a peel gas from a peel gas spray device 26. The soft magnetic alloy with the composition according to First Embodiment has a high uniformity of the cooled ribbon 24 and has fewer crystal phases composed of crystals having a grain size of larger than 30 nm by increasing the temperature of the roller 23 and further increasing a contact time between the roller 23 and the ribbon 24 compared to prior arts. In spite of a composition where crystals having a grain size of larger than 30 nm are generated in a conventional method, it is consequently possible to obtain a soft magnetic alloy containing no crystal phases composed of crystals having a grain size of larger than 30 nm. Incidentally, when the roller has a normal temperature of 5 to 30° C. while being rotated in the opposite direction (see FIG. 1) to the normal direction, the ribbon 24 is easily peeled from the roller 23, and the effect of the opposite rotation cannot be obtained.

In the single roller method, the thickness of the ribbon 24 to be obtained can be controlled by mainly controlling the rotating speed of the roller 23, but can also be controlled by, for example, controlling the distance between the nozzle 21 and the roller 23, the temperature of the molten metal, and the like. The ribbon 24 has any thickness. For example, the ribbon 24 may have a thickness of 15 to 30 μm.

The chamber 25 has any inner vapor pressure. For example, the chamber 25 may have an inner vapor pressure of 11 hPa or less using an Ar gas whose dew point is adjusted. Incidentally, the chamber 25 has no lower limit for inner vapor pressure. The chamber 25 may have a vapor pressure of 1 hPa or less by being filled with an Ar gas whose dew point is adjusted or by being turned into a state close to vacuum.

The ribbon 24 (soft magnetic alloy according to the present embodiment) contains an amorphous phase containing no crystals having a grain size of larger than 30 nm and has a nanohetero structure where initial fine crystals exist in the amorphous phase. When the soft magnetic alloy undergoes the following heat treatment, Fe based nanocrystallines are easily deposited.

Incidentally, any method, such as a normal X-ray diffraction measurement, can be used for confirming whether the ribbon 24 contains crystals having a grain size of larger than 30 nm.

The existence and average grain size of the above-mentioned initial fine crystals are observed by any method, and can be observed by, for example, obtaining a selected area electron diffraction image, a nano beam diffraction image, a bright field image, or a high resolution image using a transmission electron microscope with respect to a sample thinned by ion milling. When using a selected area electron diffraction image or a nano beam diffraction image, with respect to diffraction pattern, a ring-shaped diffraction is formed in case of being amorphous, and diffraction spots due to crystal structure are formed in case of being non-amorphous. When using a bright field image or a high resolution image, an existence and an average grain size of initial fine crystals can be confirmed by visual observation with a magnification of $1.00\times10^5$ to $3.00\times10^5$.

The roller has any temperature and rotating speed, and the chamber has any atmosphere. Preferably, the roller has a temperature of 4 to 30° C. for amorphization. The faster a rotating speed of the roller is, the smaller an average grain size of initial fine crystals is. Preferably, the roller has a rotating speed of 25 to 30 m/sec. for obtaining initial fine crystals having an average grain size of 0.3 to 10 nm. In view of cost, the chamber preferably has an atmosphere air.

Hereinafter, explained is a method of manufacturing a soft magnetic alloy having a structure of Fe based nanocrystallines (a soft magnetic alloy according to the third aspect of the present invention) by carrying out a heat treatment against a ribbon 24 composed of a soft magnetic alloy having a nanohetero structure (a soft magnetic alloy according to the first aspect of the present invention).

The soft magnetic alloy according to the present embodiment is manufactured with any heat-treatment conditions. Favorable heat-treatment conditions differ depending on a composition of the soft magnetic alloy. Normally, a heat-treatment temperature is preferably about 450 to 650° C., and a heat-treatment time is preferably about 0.5 to 10 hours, but favorable heat-treatment temperature and heat-treatment time may be in a range deviated from the above ranges depending on the composition. The heat treatment is carried out in any atmosphere, such as an active atmosphere of air and an inert atmosphere of Ar gas.

Any method, such as observation using a transmission electron microscope, is employed for calculation of an average grain size of Fe based nanocrystallines contained in the soft magnetic alloy obtained by heat treatment. The crystal structure of bcc (body-centered cubic structure) is also confirmed by any method, such as X-ray diffraction measurement.

In addition to the above-mentioned single roller method, a powder of the soft magnetic alloy according to the present embodiment is obtained by a water atomizing method or a gas atomizing method, for example. Hereinafter, a gas atomizing method is explained.

In a gas atomizing method, a molten alloy of 1200 to 1500° C. is obtained similarly to the above-mentioned single roller method. Thereafter, the molten alloy is sprayed in a chamber, and a powder is prepared.

At this time, the above-mentioned favorable nanohetero structure is obtained easily with a gas spray temperature of 50 to 200° C. and a vapor pressure of 4 hPa or less in the chamber.

After the powder composed of the soft magnetic alloy having the nanohetero structure is prepared by the gas atomizing method, a heat treatment is conducted at 400 to 600° C. for 0.5 to 10 minutes. This makes it possible to promote diffusion of atoms while the powder is prevented from being coarse due to sintering of each grain, reach a thermodynamic equilibrium state for a short time, remove distortion and stress, and easily obtain a Fe based soft magnetic alloy having an average grain size of 10 to 50 nm.

Second Embodiment

Hereinafter, Second Embodiment of the present invention is explained. The same matters as First Embodiment are not explained.

In Second Embodiment, a soft magnetic alloy before heat treatment is composed of only amorphous phases. Even if the soft magnetic alloy before heat treatment is composed of only amorphous phases, contains no initial fine crystals, and has no nanohetero structure, a soft magnetic alloy having a Fe based nanocrystalline structure, namely, a soft magnetic alloy according to the third aspect of the present invention can be obtained by heat treatment.

Compared to First Embodiment, however, Fe based nanocrystallines are hard to be deposited by heat treatment, and the average grain size of the Fe based nanocrystallines is hard to be controlled. Thus, excellent characteristics are hard to be obtained compared to First Embodiment.

Third Embodiment

Hereinafter, Third Embodiment of the present invention is explained. The same matters as First Embodiment are not explained.

The soft magnetic alloy according to the present embodiment includes a main component of $(Fe_{(1-(\alpha+\beta))}X1_{\alpha}X2_{\beta})_{(1-(a+b+c+d+e))}M_aB_bP_cSi_dC_e$, in which X1 is one or more of Co and Ni, X2 is one or more of Al, Mn, Ag, Zn, Sn, As, Sb, Cu, Cr, Bi, N, O, and rare earth elements, M is one or more of Nb, Hf, Zr, Ta, Mo, W, and V, $0.020\leq a\leq 0.14$ is satisfied, $0.020<b\leq 0.20$ is satisfied, $0<c\leq 0.040$ is satisfied, $0\leq d\leq 0.060$ is satisfied, $0.0005<e<0.0050$ is satisfied, $\alpha\geq 0$ is satisfied, $\beta\geq 0$ is satisfied, and $0\leq\alpha+\beta\leq 0.50$ is satisfied, wherein the soft magnetic alloy has a nanohetero structure where initial fine crystals exist in an amorphous phase.

When the above-mentioned soft magnetic alloy (a soft magnetic alloy according to the second aspect of the present invention) undergoes a heat treatment, Fe based nanocrystallines are easily deposited in the soft magnetic alloy. In other words, the above-mentioned soft magnetic alloy easily becomes a starting raw material of a soft magnetic alloy where Fe based nanocrystallines are deposited (a soft magnetic alloy according to the fourth aspect of the present invention). Incidentally, the initial fine crystals preferably have an average grain size of 0.3 to 10 nm.

The soft magnetic alloy according to the fourth aspect of the present invention has the same main component as the soft magnetic alloy according to the second aspect and has a structure of Fe based nanocrystallines.

The content P (c) satisfies $0<c\leq 0.040$. The content P (c) is preferably $0.010\leq c\leq 0.040$, more preferably $0.020\leq c\leq 0.030$. When the content P (c) is in the above range, the soft magnetic alloy has an improved resistivity and a low coercivity. Moreover, when the soft magnetic alloy has an improved resistivity, a high permeability μ' can be maintained to a higher frequency. When c=0 is satisfied, the above-mentioned effects cannot be obtained.

The C content (e) satisfies $0.0005<e<0.0050$. The C content (e) is preferably $0.0006\leq e\leq 0.0045$, more preferably $0.0020\leq e\leq 0.0045$. When the C content (e) is larger than 0.0005, the soft magnetic alloy easily has an improved resistivity and particularly easily has a low coercivity, and a high permeability μ' can be maintained to a high frequency. When the C content (e) is too large, saturation magnetic flux density is decreased.

Preferably, X2 is one or more of Al, Mn, Ag, Zn, Sn, As, Sb, Cu, Cr, Bi, N, O, and rare earth elements. When X2 is one or more of Al, Mn, Ag, Zn, Sn, As, Sb, Cu, Cr, Bi, N, O, and rare earth elements, it becomes easier to obtain a soft magnetic alloy containing no crystal phases composed of crystals having a grain size of larger than 30 nm (a soft magnetic alloy according to the second aspect of the present invention). When this soft magnetic alloy undergoes a heat treatment, it becomes easier to obtain a soft magnetic alloy having a structure of Fe based nanocrystallines (a soft magnetic alloy according to the fourth aspect of the present invention).

Fourth Embodiment

Hereinafter, Fourth Embodiment of the present invention is explained. The same matters as Third Embodiment are not explained.

In Fourth Embodiment, a soft magnetic alloy before heat treatment is composed of only amorphous phases. Even if the soft magnetic alloy before heat treatment is composed of only amorphous phases, contains no initial fine crystals, and has no nanohetero structure, a soft magnetic alloy having a Fe based nanocrystalline structure, namely, a soft magnetic alloy according to the fourth aspect of the present invention can be obtained by heat treatment.

Compared to Third Embodiment, however, Fe based nanocrystallines are hard to be deposited by heat treatment, and the average grain size of the Fe based nanocrystallines is hard to be obtained. Thus, excellent characteristics are hard to be obtained compared to Third Embodiment.

Fifth Embodiment

A magnetic device, especially a magnetic core and an inductor, according to Fifth Embodiment is obtained from the soft magnetic alloy according to any of First Embodiment to Fourth Embodiment. Hereinafter, a magnetic core and an inductor according to Fifth Embodiment are explained, but the following method is not the only one method for obtaining the magnetic core and the inductor from the soft magnetic alloy. In addition to inductors, the magnetic core is used for transformers, motors, and the like.

For example, a magnetic core from a ribbon-shaped soft magnetic alloy is obtained by winding or laminating the ribbon-shaped soft magnetic alloy. When the ribbon-shaped soft magnetic alloy is laminated via an insulator, a magnetic core having further improved properties can be obtained.

For example, a magnetic core from a powder-shaped soft magnetic alloy is obtained by appropriately mixing the powder-shaped soft magnetic alloy with a binder and pressing this using a die. When an oxidation treatment, an insulation coating, or the like is carried out against the surface of the powder before the mixture with the binder, resistivity is improved, and the magnetic core becomes more suitable for high-frequency regions.

The pressing method is not limited. Examples of the pressing method include a pressing using a die and a mold pressing. There is no limit to the type of the binder. Examples of the binder include a silicone resin. There is no limit to a mixture ratio between the soft magnetic alloy powder and the binder either. For example, 1 to 10 mass % of the binder is mixed with 100 mass % of the soft magnetic alloy powder.

For example, 100 mass % of the soft magnetic alloy powder is mixed with 1 to 5 mass % of a binder and compressively pressed using a die, and it is thereby possible to obtain a magnetic core having a space factor (powder filling rate) of 70% or more, a magnetic flux density of 0.45 T or more at the time of applying a magnetic field of $1.6\times10^4$ A/m, and a resistivity of 1 Ω·cm or more. These properties are equivalent to or more excellent than those of normal ferrite magnetic cores.

For example, 100 mass % of the soft magnetic alloy powder is mixed with 1 to 3 mass % of a binder and compressively pressed using a die under a temperature condition that is equal to or higher than a softening point of the binder, and it is thereby possible to obtain a dust core having a space factor of 80% or more, a magnetic flux density of 0.9 T or more at the time of applying a magnetic field of $1.6\times10^4$ A/m, and a resistivity of 0.1 Ω·cm or more. These properties are more excellent than those of normal dust cores.

Moreover, a green compact constituting the above-mentioned magnetic core undergoes a heat treatment after the pressing for distortion removal. This further reduces core loss and improves usefulness. Incidentally, core loss of the magnetic core is decreased by reduction in coercivity of a magnetic material constituting the magnetic core.

An inductance product is obtained by winding a wire around the above-mentioned magnetic core. The wire is wound by any method, and the inductance product is manufactured by any method. For example, a wire is wound around a magnetic core manufactured by the above-mentioned method at least in one or more turns.

Moreover, when using soft magnetic alloy grains, there is a method of manufacturing an inductance product by pressing and integrating a magnetic material incorporating a wire coil. In this case, an inductance product corresponding to high frequencies and large electric current is obtained easily.

Moreover, when using soft magnetic alloy grains, an inductance product can be obtained by carrying out firing after alternately printing and laminating a soft magnetic alloy paste obtained by pasting the soft magnetic alloy grains added with a binder and a solvent and a conductor paste obtained by pasting a conductor metal for coils added with a binder and a solvent. Instead, an inductance product where a coil is incorporated into a magnetic material can be obtained by preparing a soft magnetic alloy sheet using a soft magnetic alloy paste, printing a conductor paste on the surface of the soft magnetic alloy sheet, and laminating and firing them.

Here, when an inductance product is manufactured using soft magnetic alloy grains, in view of obtaining excellent Q properties, it is preferred to use a soft magnetic alloy powder whose maximum grain size is 45 μm or less by sieve diameter and center grain size (D50) is 30 μm or less. In order to have a maximum grain size of 45 μm or less by sieve diameter, only a soft magnetic alloy powder that passes through a sieve whose mesh size is 45 μm may be used.

The larger a maximum grain size of a soft magnetic alloy powder is, the further Q values in high-frequency regions tend to decrease. In particular, when using a soft magnetic alloy powder whose maximum grain diameter is larger than 45 μm by sieve diameter, Q values in high-frequency regions may decrease greatly. When Q values in high-frequency regions are not so important, however, a soft magnetic alloy powder having a large variation can be used. When a soft magnetic alloy powder having a large variation is used, cost can be reduced as it can be manufactured comparatively inexpensively.

Hereinbefore, the embodiments of the present invention are explained, but the present invention is not limited to the above embodiments.

The soft magnetic alloy has any shape. For example, the soft magnetic alloy has a ribbon shape or a powder shape as mentioned above, but may have another shape of block etc.

The soft magnetic alloys (Fe based nanocrystalline alloys) according to First Embodiment to Fourth Embodiment are used for any purposes, such as magnetic devices (particularly magnetic cores), and can favorably be used as magnetic cores for inductors (particularly for power inductors). In addition to magnetic cores, the soft magnetic alloys according to the embodiments can favorably be used for thin film inductors and magnetic heads.

EXAMPLES

Hereinafter, the present invention is specifically explained based on Examples.

Experimental Example 1

Raw material metals were weighed so that the alloy compositions of Examples and Comparative Examples shown in the following table would be obtained, and the weighed raw material metals were melted by high-frequency heating. Then, base alloys were manufactured. Incidentally, the compositions of Sample No. 9 and Sample No. 10 were a composition of a normally well-known amorphous alloy.

The manufactured base alloys were thereafter heated, melted, and turned into a molten metal at 1250° C. This metal was sprayed against a roller rotating at 25 m/sec. (single roller method), and ribbons were thereby obtained. Incidentally, the roller was made of Cu.

In Sample No. 1 to Sample No. 4, the roller was rotated in the direction shown in FIG. 2, and the roller temperature was 30° C. In Sample No. 1 to Sample No. 4, the roller rotating speed was controlled, and the ribbons to be obtained thereby had a thickness of 20 μm to 30 μm, a width of 4 mm to 5 mm, and a length of several tens of meter.

In Sample No. 5 to Sample No. 10, the roller was rotated in the direction shown in FIG. 1, and the roller temperature was 70° C. In Sample No. 5 to Sample No. 10, the ribbon to be obtained had a thickness of 20 μm to 30 μm, a width of 4 mm to 5 mm, and a length of several tens of meter, provided that the differential pressure between the inside of the chamber and the inside of the spray nozzle was 105 kPa, that the nozzle diameter was 5 mm slit, that the flow rate was 50 g, and that the roller diameter φ was 300 mm.

In Sample No. 7a and Sample No. 8a, the roller was rotated in the direction shown in FIG. 1, and the roller temperature was 30° C. In Sample No. 7a and Sample No. 8a, the ribbon to be obtained had a thickness of 20 μm to 30 μm, a width of 4 mm to 5 mm, and a length of several tens of meter, provided that the differential pressure between the inside of the chamber and the inside of the spray nozzle was 105 kPa, that the nozzle diameter was 5 mm slit, that the flow rate was 50 g, and that the roller diameter φ was 300 mm.

Each of the obtained ribbons underwent an X-ray diffraction measurement and was confirmed if it contained crystals having a grain size of larger than 30 nm. When crystals having a grain size of larger than 30 nm did not exist, the ribbon was considered to be composed of amorphous phases. When crystals having a grain size of larger than 30 nm existed, the ribbon was considered to be composed of crystalline phases. Incidentally, all of Examples except for Sample No. 135 mentioned below had a nanohetero structure where initial fine crystals existed in amorphous phases.

After that, each ribbon of Examples and Comparative Examples underwent a heat treatment with the conditions shown in the following table. Each ribbon after the heat treatment was measured for resistivity, saturation magnetic flux density, coercivity, and permeability μ'. The resistivity (ρ) was measured by four probe method. The saturation magnetic flux density (Bs) was measured in a magnetic field of 1000 kA/m using a vibrating sample type magnetometer (VSM). The coercivity (Hc) was measured in a magnetic field of 5 kA/m using a DC BH tracer. The permeability μ' was measured by changing frequency using an impedance analyzer and was evaluated as a frequency when the permeability μ' became 10000 (hereinafter, also referred to as a specific frequency f). In Experimental Examples 1 to 3, a resistivity of 110 μΩcm or more was represented by ⊚, a resistivity of 100 μΩcm or more and less than 110 μΩcm was represented by ○, and a resistivity of less than 100 μΩcm was x. The evaluation was higher in the order of ⊚, ○, and x. The evaluation of ⊚ and ○ was considered to be good. In Experimental Examples 1 to 3, a saturation magnetic flux density of 1.35 T or more was considered to be good, and a saturation magnetic flux density of 1.40 T or more was considered to be better. In Experimental Examples 1 to 3, a coercivity of 3.0 A/m or less was considered to be good, a coercivity of 2.5 A/m or less was considered to be better, a coercivity of 2.0 A/m or less was considered to be still better, and a coercivity of 1.5 A/m or less was considered to be best. In Experimental Examples 1 to 3, the permeability μ' was considered to be good when a specific frequency f was 100 kHz or more.

Unless otherwise noted, a measurement of X-ray diffraction and an observation using a transmission electron microscope confirmed that all of Examples shown below contained Fe based nanocrystallines having an average grain size of 5 to 30 nm and having a crystal structure of bcc. An ICP analysis also confirmed that the alloy composition did not change before and after the heat treatment.

TABLE 1

| | | | | (Fe (1 − (a + b + c + d + e) ) MaBbPcSidCe (α = β = 0) | | | | | | | | | | |
|---|---|---|---|---|---|---|---|---|---|---|---|---|---|---|
| Sample No. | Comparative Example/ Example | roller contact distance (cm) | roller temperature (° C.) | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 1 | Comp. Ex. | 6 | 30 | 0.840 | 0.070 | 0.090 | 0.000 | 0.000 | 0.000 | amorphous phase | X | 6.3 | 1.58 | 30 |
| 2 | Comp. Ex. | 6 | 30 | 0.820 | 0.070 | 0.090 | 0.020 | 0.000 | 0.000 | amorphous phase | X | 2.4 | 1.54 | 50 |

TABLE 1-continued

| | | | | (Fe (1 − (a + b + c + d + e) ) MaBbPcSidCe (α = β = 0) | | | | | | | | | | |
|---|---|---|---|---|---|---|---|---|---|---|---|---|---|---|
| Sample No. | Comparative Example/ Example | roller contact distance (cm) | roller temperature (° C.) | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 3 | Comp. Ex. | 6 | 30 | 0.795 | 0.070 | 0.090 | 0.045 | 0.000 | 0.000 | crystalline phase | X | 189 | 1.43 | — |
| 4 | Comp. Ex. | 6 | 30 | 0.760 | 0.070 | 0.090 | 0.080 | 0.000 | 0.000 | crystalline phase | X | 2740 | 1.41 | — |
| 5 | Comp. Ex. | 18 | 70 | 0.840 | 0.070 | 0.090 | 0.000 | 0.000 | 0.000 | amorphous phase | X | 6.1 | 1.58 | 40 |
| 6 | Comp. Ex. | 18 | 70 | 0.820 | 0.070 | 0.090 | 0.020 | 0.000 | 0.000 | amorphous phase | X | 2.3 | 1.53 | 60 |
| 7 | Ex. | 18 | 70 | 0.795 | 0.070 | 0.090 | 0.045 | 0.000 | 0.000 | amorphous phase | ○ | 2.0 | 1.49 | 110 |
| 8 | Ex. | 18 | 70 | 0.760 | 0.070 | 0.090 | 0.080 | 0.000 | 0.000 | amorphous phase | ○ | 2.2 | 1.47 | 130 |
| 7a | Comp. Ex. | 18 | 30 | 0.795 | 0.070 | 0.090 | 0.045 | 0.000 | 0.000 | crystalline phase | X | 287 | 1.41 | — |
| 8a | Comp. Ex. | 18 | 30 | 0.760 | 0.070 | 0.090 | 0.080 | 0.000 | 0.000 | crystalline phase | X | 2931 | 1.42 | — |
| 9 | Comp. Ex. | 18 | 70 | 0.780 | 0.000 | 0.130 | 0.000 | 0.090 | 0.000 | amorphous phase | ◎ | 1.5 | 1.60 | 40 |
| 10 | Comp. Ex. | 18 | 70 | Co66Fe4Si17B13 | | | | | | amorphous phase | ◎ | 2.2 | 0.50 | 80 |

Table 1 shows that all characteristics were good in Sample No. 7 and Sample No. 8 (each component content was in a predetermined range, and the roller contact distance and the roller temperature were controlled favorably). On the other hand, Table 1 shows that any of characteristics was bad in Sample No. 1, Sample No. 2, Sample No. 5, Sample No. 6, Sample No. 9, and Sample No. 10 (each component content, especially P content, was outside a predetermined range). Table 1 also shows that the ribbon before the heat treatment was composed of crystalline phases and had a small resistivity, a significantly large coercivity, a significantly small permeability μ', and no specific frequency f after the heat treatment in Sample No. 3, Sample No. 4, Sample No. 7a, and Sample No. 8a (each component content was in a predetermined range, but the roller contact distance and/or the roller temperature was/were not controlled favorably).

Experimental Example 2

Experimental Example 2 was carried out with the same conditions as Sample No. 5 to Sample No. 10 of Experimental Example 1 except that base alloys were manufactured by weighing raw material metals so that alloy compositions of Examples and Comparative Examples shown in the following tables would be obtained and by melting the raw material metals with high-frequency heating.

TABLE 2

| | | (Fe (1 − (a + b + c + d + e) ) MaBbPcSidCe (α = β = 0) | | | | | | | | | | |
|---|---|---|---|---|---|---|---|---|---|---|---|---|
| Sample No. | Comparative Example/ Example | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 12 | Comp. Ex. | 0.845 | 0.015 | 0.090 | 0.050 | 0.000 | 0.000 | crystalline phase | X | 336 | 1.46 | — |
| 13 | Ex. | 0.840 | 0.020 | 0.090 | 0.050 | 0.000 | 0.000 | amorphous phase | ○ | 2.8 | 1.58 | 110 |
| 14 | Ex. | 0.820 | 0.040 | 0.090 | 0.050 | 0.000 | 0.000 | amorphous phase | ○ | 2.4 | 1.56 | 120 |

TABLE 2-continued

| | | (Fe (1 − (a + b + c + d + e) ) MaBbPcSidCe (α = β = 0) | | | | | | | | | | |
|---|---|---|---|---|---|---|---|---|---|---|---|---|
| Sample No. | Comparative Example/ Example | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 15 | Ex. | 0.810 | 0.050 | 0.090 | 0.050 | 0.000 | 0.000 | amorphous phase | ○ | 1.9 | 1.53 | 150 |
| 11 | Ex. | 0.800 | 0.060 | 0.090 | 0.050 | 0.000 | 0.000 | amorphous phase | ○ | 1.8 | 1.52 | 110 |
| 16 | Ex. | 0.780 | 0.080 | 0.090 | 0.050 | 0.000 | 0.000 | amorphous phase | ○ | 1.8 | 1.48 | 140 |
| 17 | Ex. | 0.760 | 0.100 | 0.090 | 0.050 | 0.000 | 0.000 | amorphous phase | ○ | 2.3 | 1.44 | 130 |
| 18 | Ex. | 0.740 | 0.120 | 0.090 | 0.050 | 0.000 | 0.000 | amorphous phase | ○ | 2.7 | 1.42 | 140 |
| 19 | Ex. | 0.720 | 0.140 | 0.090 | 0.050 | 0.000 | 0.000 | amorphous phase | ○ | 2.7 | 1.38 | 150 |
| 20 | Comp. Ex. | 0.710 | 0.150 | 0.090 | 0.050 | 0.000 | 0.000 | amorphous phase | ○ | 2.9 | 1.22 | 150 |
| 21 | Comp. Ex. | 0.870 | 0.060 | 0.020 | 0.050 | 0.000 | 0.000 | crystalline phase | X | 217 | 1.60 | — |
| 22 | Ex. | 0.865 | 0.060 | 0.025 | 0.050 | 0.000 | 0.000 | amorphous phase | ○ | 2.6 | 1.62 | 110 |
| 23 | Ex. | 0.830 | 0.060 | 0.060 | 0.050 | 0.000 | 0.000 | amorphous phase | ○ | 2.1 | 1.57 | 110 |
| 24 | Ex. | 0.810 | 0.060 | 0.080 | 0.050 | 0.000 | 0.000 | amorphous phase | ○ | 1.8 | 1.56 | 120 |
| 11 | Ex. | 0.800 | 0.060 | 0.090 | 0.050 | 0.000 | 0.000 | amorphous phase | ○ | 1.8 | 1.52 | 110 |
| 25 | Ex. | 0.770 | 0.060 | 0.120 | 0.050 | 0.000 | 0.000 | amorphous phase | ○ | 2.0 | 1.45 | 130 |
| 26 | Ex. | 0.740 | 0.060 | 0.150 | 0.050 | 0.000 | 0.000 | amorphous phase | ○ | 2.5 | 1.40 | 130 |
| 27 | Ex. | 0.690 | 0.060 | 0.200 | 0.050 | 0.000 | 0.000 | amorphous phase | ○ | 2.7 | 1.35 | 130 |
| 28 | Comp. Ex. | 0.680 | 0.060 | 0.210 | 0.050 | 0.000 | 0.000 | amorphous phase | ○ | 2.9 | 1.20 | 140 |
| 29 | Comp. Ex. | 0.810 | 0.060 | 0.090 | 0.040 | 0.000 | 0.000 | amorphous phase | X | 3.3 | 1.49 | 90 |
| 30 | Ex. | 0.809 | 0.060 | 0.090 | 0.041 | 0.000 | 0.000 | amorphous phase | ○ | 2.6 | 1.47 | 100 |
| 31 | Ex. | 0.805 | 0.060 | 0.090 | 0.045 | 0.000 | 0.000 | amorphous phase | ○ | 2.3 | 1.46 | 110 |
| 11 | Ex. | 0.800 | 0.060 | 0.090 | 0.050 | 0.000 | 0.000 | amorphous phase | ○ | 1.8 | 1.52 | 110 |
| 32 | Ex. | 0.780 | 0.060 | 0.090 | 0.070 | 0.000 | 0.000 | amorphous phase | ○ | 1.8 | 1.40 | 120 |
| 33 | Ex. | 0.770 | 0.060 | 0.090 | 0.080 | 0.000 | 0.000 | amorphous phase | ○ | 2.2 | 1.43 | 130 |
| 34 | Ex. | 0.750 | 0.060 | 0.090 | 0.100 | 0.000 | 0.000 | amorphous phase | ○ | 2.5 | 1.41 | 140 |

TABLE 2-continued

| | | (Fe (1 − (a + b + c + d + e) ) MaBbPcSidCe (α = β = 0) | | | | | | | | | | |
|---|---|---|---|---|---|---|---|---|---|---|---|---|
| Sample No. | Comparative Example/ Example | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 35 | Ex. | 0.700 | 0.060 | 0.090 | 0.150 | 0.000 | 0.000 | amorphous phase | ○ | 2.7 | 1.37 | 140 |
| 36 | Comp. Ex. | 0.690 | 0.060 | 0.090 | 0.160 | 0.000 | 0.000 | amorphous phase | ○ | 2.8 | 1.28 | 140 |
| 11 | Ex. | 0.800 | 0.060 | 0.090 | 0.050 | 0.000 | 0.000 | amorphous phase | ○ | 1.8 | 1.52 | 110 |
| 37 | Ex. | 0.799 | 0.060 | 0.090 | 0.050 | 0.000 | 0.001 | amorphous phase | ○ | 1.4 | 1.51 | 140 |
| 38 | Ex. | 0.795 | 0.060 | 0.090 | 0.050 | 0.000 | 0.005 | amorphous phase | ○ | 1.2 | 1.51 | 150 |
| 39 | Ex. | 0.790 | 0.060 | 0.090 | 0.050 | 0.000 | 0.010 | amorphous phase | ○ | 1.5 | 1.50 | 140 |
| 40 | Ex. | 0.770 | 0.060 | 0.090 | 0.050 | 0.000 | 0.030 | amorphous phase | ○ | 1.7 | 1.48 | 120 |
| 41 | Comp. Ex. | 0.760 | 0.060 | 0.090 | 0.050 | 0.000 | 0.040 | amorphous phase | X | 3.2 | 1.43 | 80 |
| 42 | Ex. | 0.795 | 0.060 | 0.090 | 0.050 | 0.005 | 0.000 | amorphous phase | ○ | 1.7 | 1.53 | 140 |
| 43 | Ex. | 0.790 | 0.060 | 0.090 | 0.050 | 0.010 | 0.000 | amorphous phase | ◎ | 1.6 | 1.52 | 200 |
| 44 | Ex. | 0.780 | 0.060 | 0.090 | 0.050 | 0.020 | 0.000 | amorphous phase | ◎ | 1.6 | 1.50 | 230 |
| 45 | Ex. | 0.770 | 0.060 | 0.090 | 0.050 | 0.030 | 0.000 | amorphous phase | ◎ | 2.1 | 1.46 | 240 |
| 46 | Ex. | 0.740 | 0.060 | 0.090 | 0.050 | 0.060 | 0.000 | amorphous phase | ◎ | 2.5 | 1.42 | 250 |
| 47 | Comp. Ex. | 0.730 | 0.060 | 0.090 | 0.050 | 0.070 | 0.000 | amorphous phase | ◎ | 3.8 | 1.40 | 180 |
| 48 | Ex. | 0.794 | 0.060 | 0.090 | 0.045 | 0.010 | 0.001 | amorphous phase | ◎ | 1.3 | 1.54 | 210 |
| 49 | Ex. | 0.780 | 0.060 | 0.090 | 0.045 | 0.020 | 0.005 | amorphous phase | ◎ | 1.5 | 1.49 | 200 |
| 50 | Ex. | 0.730 | 0.080 | 0.120 | 0.070 | 0.000 | 0.000 | amorphous phase | ○ | 2.9 | 1.40 | 130 |
| 11 | Ex. | 0.800 | 0.060 | 0.090 | 0.050 | 0.000 | 0.000 | amorphous phase | ○ | 1.8 | 1.52 | 110 |
| 51 | Ex. | 0.880 | 0.040 | 0.030 | 0.050 | 0.000 | 0.000 | amorphous phase | ○ | 2.7 | 1.67 | 140 |
| 52 | Ex. | 0.900 | 0.030 | 0.029 | 0.041 | 0.000 | 0.000 | amorphous phase | ○ | 2.6 | 1.7 | 150 |

TABLE 3

Fe (1 − (a + b + c + d + e) ) MaBbPcSidCe
(α = β = 0, b to e are the same as those of Sample No. 14, Sample No. 11, or Sample No. 18)

| Sample No. | Comparative Example/ Example | M type | M a | XRD | resistivity ρ (μ Ω cm) | coercivity Hc (A/m) | saturation magnetic flux density Bs (T) | specific frequency f (kHz) |
|---|---|---|---|---|---|---|---|---|
| 14 | Ex. | Nb | 0.040 | amorphous phase | ○ | 2.4 | 1.56 | 120 |
| 53 | Ex. | Hf | 0.040 | amorphous phase | ○ | 2.5 | 1.54 | 130 |
| 54 | Ex. | Zr | 0.040 | amorphous phase | ○ | 2.3 | 1.55 | 120 |
| 55 | Ex. | Ta | 0.040 | amorphous phase | ○ | 2.3 | 1.53 | 110 |
| 56 | Ex. | Mo | 0.040 | amorphous phase | ○ | 2.5 | 1.56 | 120 |
| 57 | Ex. | W | 0.040 | amorphous phase | ○ | 2.5 | 1.53 | 130 |
| 58 | Ex. | V | 0.040 | amorphous phase | ○ | 2.4 | 1.53 | 120 |
| 59 | Ex. | Nb0.5Hf0.5 | 0.040 | amorphous phase | ○ | 2.4 | 1.55 | 110 |
| 60 | Ex. | Zr0.5Ta0.5 | 0.040 | amorphous phase | ○ | 2.3 | 1.53 | 120 |
| 61 | Ex. | Nb0.4Hf0.3Zr0.3 | 0.040 | amorphous phase | ○ | 2.4 | 1.54 | 120 |
| 11 | Ex. | Nb | 0.060 | amorphous phase | ○ | 1.8 | 1.52 | 110 |
| 62 | Ex. | Hf | 0.060 | amorphous phase | ○ | 1.8 | 1.51 | 120 |
| 63 | Ex. | Zr | 0.060 | amorphous phase | ○ | 1.7 | 1.52 | 120 |
| 64 | Ex. | Ta | 0.060 | amorphous phase | ○ | 1.7 | 1.53 | 130 |
| 65 | Ex. | Mo | 0.060 | amorphous phase | ○ | 2.0 | 1.50 | 110 |
| 66 | Ex. | W | 0.060 | amorphous phase | ○ | 2.0 | 1.50 | 110 |
| 67 | Ex. | V | 0.060 | amorphous phase | ○ | 1.9 | 1.51 | 110 |
| 68 | Ex. | Nb0.5Hf0.5 | 0.060 | amorphous phase | ○ | 1.8 | 1.52 | 120 |
| 69 | Ex. | Zr0.5Ta0.5 | 0.060 | amorphous phase | ○ | 1.9 | 1.53 | 130 |
| 70 | Ex. | Nb0.4Hf0.3Zr0.3 | 0.060 | amorphous phase | ○ | 2.0 | 1.51 | 130 |
| 18 | Ex. | Nb | 0.120 | amorphous phase | ○ | 2.7 | 1.42 | 140 |
| 71 | Ex. | Hf | 0.120 | amorphous phase | ○ | 2.6 | 1.41 | 140 |
| 72 | Ex. | Zr | 0.120 | amorphous phase | ○ | 2.7 | 1.43 | 120 |
| 73 | Ex. | Ta | 0.120 | amorphous phase | ○ | 2.8 | 1.43 | 130 |
| 74 | Ex. | Mo | 0.120 | amorphous phase | ○ | 2.5 | 1.40 | 120 |
| 75 | Ex. | W | 0.120 | amorphous phase | ○ | 2.6 | 1.40 | 120 |
| 76 | Ex. | V | 0.120 | amorphous phase | ○ | 2.8 | 1.41 | 100 |
| 77 | Ex. | Nb0.5Hf0.5 | 0.120 | amorphous phase | ○ | 2.6 | 1.42 | 110 |
| 78 | Ex. | Zr0.5Ta0.5 | 0.120 | amorphous phase | ○ | 2.8 | 1.41 | 120 |
| 79 | Ex. | Nb0.4Hf0.3Zr0.3 | 0.120 | amorphous phase | ○ | 2.8 | 1.42 | 130 |

TABLE 4

| | | Fe (1 − (α + β)) X1αX2β (a to e are the same as those of Sample No. 11) | | | | | | | | |
|---|---|---|---|---|---|---|---|---|---|---|
| | Comparative | X1 | | X2 | | | resistivity | coercivity | saturation magnetic flux density | specific frequency |
| Sample No. | Example/ Example | type | α\|1 − (a + b + c + d + e)\| | type | β\|1 − (a + b + c + d + e)\| | XRD | ρ (μ Ω cm) | Hc (A/m) | Bs (T) | f (kHz) |
| 11 | Ex. | — | 0.000 | — | 0.000 | amorphous phase | ○ | 1.8 | 1.52 | 110 |
| 81 | Ex. | Co | 0.010 | — | 0.000 | amorphous phase | ○ | 2.1 | 1.53 | 120 |
| 82 | Ex. | Co | 0.100 | — | 0.000 | amorphous phase | ○ | 2.5 | 1.55 | 120 |
| 83 | Ex. | Co | 0.400 | — | 0.000 | amorphous phase | ○ | 2.9 | 1.60 | 120 |
| 84 | Ex. | Ni | 0.010 | — | 0.000 | amorphous phase | ○ | 1.8 | 1.51 | 120 |
| 85 | Ex. | Ni | 0.100 | — | 0.000 | amorphous phase | ○ | 1.7 | 1.47 | 120 |
| 86 | Ex. | Ni | 0.400 | — | 0.000 | amorphous phase | ○ | 1.6 | 1.42 | 130 |
| 87 | Ex. | — | 0.000 | Al | 0.001 | amorphous phase | ○ | 1.8 | 1.52 | 110 |
| 88 | Ex. | — | 0.000 | Al | 0.005 | amorphous phase | ◎ | 1.8 | 1.51 | 110 |
| 89 | Ex. | — | 0.000 | Al | 0.010 | amorphous phase | ◎ | 1.7 | 1.51 | 110 |
| 90 | Ex. | — | 0.000 | Al | 0.030 | amorphous phase | ◎ | 1.8 | 1.50 | 120 |
| 91 | Ex. | — | 0.000 | Zn | 0.001 | amorphous phase | ○ | 1.8 | 1.50 | 110 |
| 92 | Ex. | — | 0.000 | Zn | 0.005 | amorphous phase | ○ | 1.9 | 1.52 | 120 |
| 93 | Ex. | — | 0.000 | Zn | 0.010 | amorphous phase | ◎ | 1.8 | 1.50 | 120 |
| 94 | Ex. | — | 0.000 | Zn | 0.030 | amorphous phase | ◎ | 1.9 | 1.51 | 130 |
| 95 | Ex. | — | 0.000 | Sn | 0.001 | amorphous phase | ○ | 1.8 | 1.52 | 110 |
| 96 | Ex. | — | 0.000 | Sn | 0.005 | amorphous phase | ◎ | 1.9 | 1.51 | 110 |
| 97 | Ex. | — | 0.000 | Sn | 0.010 | amorphous phase | ◎ | 1.9 | 1.52 | 110 |
| 98 | Ex. | — | 0.000 | Sn | 0.030 | amorphous phase | ◎ | 2.0 | 1.50 | 110 |
| 99 | Ex. | — | 0.000 | Cu | 0.001 | amorphous phase | ◎ | 1.6 | 1.52 | 110 |
| 100 | Ex. | — | 0.000 | Cu | 0.005 | amorphous phase | ◎ | 1.7 | 1.52 | 110 |
| 101 | Ex. | — | 0.000 | Cu | 0.010 | amorphous phase | ◎ | 1.5 | 1.52 | 120 |
| 102 | Ex. | — | 0.000 | Cu | 0.030 | amorphous phase | ◎ | 1.6 | 1.54 | 130 |
| 103 | Ex. | — | 0.000 | Cr | 0.001 | amorphous phase | ◎ | 1.8 | 1.52 | 110 |
| 104 | Ex. | — | 0.000 | Cr | 0.005 | amorphous phase | ◎ | 1.7 | 1.51 | 110 |
| 105 | Ex. | — | 0.000 | Cr | 0.010 | amorphous phase | ◎ | 1.8 | 1.50 | 120 |
| 106 | Ex. | — | 0.000 | Cr | 0.030 | amorphous phase | ◎ | 1.9 | 1.51 | 120 |
| 107 | Ex. | — | 0.000 | Bi | 0.001 | amorphous phase | ◎ | 1.8 | 1.51 | 120 |
| 108 | Ex. | — | 0.000 | Bi | 0.005 | amorphous phase | ◎ | 1.7 | 1.50 | 120 |
| 109 | Ex. | — | 0.000 | Bi | 0.010 | amorphous phase | ◎ | 1.8 | 1.49 | 120 |
| 110 | Ex. | — | 0.000 | Bi | 0.030 | amorphous phase | ◎ | 2.0 | 1.48 | 120 |
| 111 | Ex. | — | 0.000 | La | 0.001 | amorphous phase | ◎ | 1.8 | 1.52 | 110 |
| 112 | Ex. | — | 0.000 | La | 0.005 | amorphous phase | ◎ | 1.9 | 1.51 | 110 |
| 113 | Ex. | — | 0.000 | La | 0.010 | amorphous phase | ◎ | 2.1 | 1.49 | 110 |
| 114 | Ex. | — | 0.000 | La | 0.030 | amorphous phase | ◎ | 2.1 | 1.48 | 110 |

TABLE 4-continued

| | | Fe (1 − (α + β)) X1αX2β (a to e are the same as those of Sample No. 11) | | | | | | | | |
|---|---|---|---|---|---|---|---|---|---|---|
| | Comparative | X1 | | X2 | | | resistivity | coercivity | saturation magnetic flux density | specific frequency |
| Sample No. | Example/ Example | type | α\|1 − (a + b + c + d + e)\| | type | β\|1 − (a + b + c + d + e)\| | XRD | ρ (μ Ω cm) | Hc (A/m) | Bs (T) | f (kHz) |
| 115 | Ex. | — | 0.000 | Y | 0.001 | amorphous phase | ⊚ | 1.9 | 1.51 | 110 |
| 116 | Ex. | — | 0.000 | Y | 0.005 | amorphous phase | ⊚ | 1.8 | 1.49 | 120 |
| 117 | Ex. | — | 0.000 | Y | 0.010 | amorphous phase | ⊚ | 1.8 | 1.48 | 120 |
| 118 | Ex. | — | 0.000 | Y | 0.030 | amorphous phase | ⊚ | 2.0 | 1.49 | 120 |
| 119 | Ex. | Co | 0.100 | Al | 0.050 | amorphous phase | ⊚ | 2.1 | 1.52 | 120 |
| 120 | Ex. | Co | 0.100 | Zn | 0.050 | amorphous phase | ⊚ | 2.2 | 1.54 | 120 |
| 121 | Ex. | Co | 0.100 | Sn | 0.050 | amorphous phase | ⊚ | 2.2 | 1.53 | 120 |
| 122 | Ex. | Co | 0.100 | Cu | 0.050 | amorphous phase | ⊚ | 2.0 | 1.53 | 120 |
| 123 | Ex. | Co | 0.100 | Cr | 0.050 | amorphous phase | ⊚ | 2.1 | 1.53 | 120 |
| 124 | Ex. | Co | 0.100 | Bi | 0.050 | amorphous phase | ⊚ | 2.2 | 1.51 | 130 |
| 125 | Ex. | Co | 0.100 | La | 0.050 | amorphous phase | ⊚ | 2.3 | 1.52 | 110 |
| 126 | Ex. | Co | 0.100 | Y | 0.050 | amorphous phase | ⊚ | 2.3 | 1.53 | 120 |
| 127 | Ex. | Ni | 0.100 | Al | 0.050 | amorphous phase | ⊚ | 1.7 | 1.48 | 130 |
| 128 | Ex. | Ni | 0.100 | Zn | 0.050 | amorphous phase | ⊚ | 1.7 | 1.47 | 130 |
| 129 | Ex. | Ni | 0.100 | Sn | 0.050 | amorphous phase | ⊚ | 1.6 | 1.48 | 120 |
| 130 | Ex. | Ni | 0.100 | Cu | 0.050 | amorphous phase | ⊚ | 1.6 | 1.49 | 140 |
| 131 | Ex. | Ni | 0.100 | Cr | 0.050 | amorphous phase | ⊚ | 1.7 | 1.47 | 130 |
| 132 | Ex. | Ni | 0.100 | Bi | 0.050 | amorphous phase | ⊚ | 1.8 | 1.48 | 120 |
| 133 | Ex. | Ni | 0.100 | La | 0.050 | amorphous phase | ⊚ | 1.8 | 1.46 | 130 |
| 134 | Ex. | Ni | 0.100 | Y | 0.050 | amorphous phase | ⊚ | 1.8 | 1.45 | 120 |

Table 2 shows examples whose M content (a), B content (b), P content (c), Si content (d), and C content (e) were changed. Incidentally, the type of M was Nb. Examples whose each component content was in a predetermined range had a good resistivity ρ, a good saturation magnetic flux density Bs, a good coercivity Hc, and a good permeability μ'.

In Sample No. 12 (M content (a) was too small), the ribbon before the heat treatment was composed of crystalline phases and had a small resistivity ρ, a significantly large coercivity Hc, a significantly small permeability μ', and no specific frequency f after the heat treatment. Sample No. 20 (M content (a) was too large) had a low saturation magnetic flux density Bs.

In Sample No. 21 (B content (a) was too small), the ribbon before the heat treatment was composed of crystalline phases and had a small resistivity ρ, a significantly large coercivity Hc, a significantly small permeability μ', and no specific frequency f after the heat treatment. Sample No. 28 (B content (a) was too large) had a low saturation magnetic flux density Bs.

Sample No. 29 (P content (c) was too small) had a small resistivity ρ, a large coercivity Hc, a small permeability μ', and a small specific frequency f after the heat treatment. Sample No. 36 (P content (c) was too large) had a low saturation magnetic flux density Bs.

Sample No. 47 (Si content (d) was too large) had a large coercivity Hc after the heat treatment. Sample No. 41 (C content (e) was too large) had a small resistivity ρ, a large coercivity Hc, a small permeability μ', and a small specific frequency f after the heat treatment.

Table 3 shows Examples whose M type was changed in Sample No. 11, Sample No. 14, and Sample No. 18. Sample No. 53 to 61 were Examples whose M type was changed in Sample No. 14. Sample No. 62 to 70 were Examples whose M type was changed in Sample No. 11. Sample No. 71 to 79 were Examples whose M type was changed in Sample No. 18.

Table 3 shows that excellent characteristics were exhibited even if the type of M was changed.

Table 4 shows Examples where a part of Fe was substituted by X1 and/or X2 in Sample No. 11.

Table 4 shows that excellent characteristics were exhibited even if a part of Fe was substituted by X1 and/or X2.

Experimental Example 3

In Experimental Example 3, the average grain size of the initial fine crystals and the average grain size of the Fe based nanocrystalline alloy in Sample No. 11 were changed by appropriately changing the temperature of molten metal and the heat-treatment conditions after the ribbon was manufactured. Table 5 shows the results. Incidentally, all samples shown in Table 5 had a good permeability μ'.

TABLE 5

| Sample No. | Comparative Example/ Example | metal temperature (° C.) | average grain size of initial fine crystals (nm) | heat treatment temperature (° C.) | heat treatment time (h.) | average grain size of Fe based nanocrystalline alloy (nm) | XRD | ρ (μ Ω cm) | Hc (A/m) | Bs (T) |
|---|---|---|---|---|---|---|---|---|---|---|
| | | Fe (1 − (a + b + c + d + e) ) MaBbPcSidCe (α = β = 0, a to e are the same as those of Sample No. 11) | | | | | | | | |
| 135 | Ex. | 1200 | no initial fine crystals | 800 | 1 | 10 | amorphous phase | ○ | 2.0 | 1.45 |
| 136 | Ex. | 1225 | 0.1 | 450 | 1 | 3 | amorphous phase | ○ | 2.0 | 1.48 |
| 137 | Ex. | 1250 | 0.3 | 500 | 1 | 5 | amorphous phase | ○ | 1.9 | 1.50 |
| 138 | Ex. | 1250 | 0.3 | 550 | 1 | 10 | amorphous phase | ○ | 1.8 | 1.50 |
| 139 | Ex. | 1250 | 0.3 | 575 | 1 | 13 | amorphous phase | ○ | 1.7 | 1.51 |
| 11 | Ex. | 1250 | 0.3 | 600 | 1 | 10 | amorphous phase | ○ | 1.8 | 1.52 |
| 141 | Ex. | 1275 | 10 | 600 | 1 | 12 | amorphous phase | ○ | 1.9 | 1.52 |
| 142 | Ex. | 1275 | 10 | 650 | 1 | 30 | amorphous phase | ○ | 1.9 | 1.52 |
| 143 | Ex. | 1300 | 15 | 600 | 1 | 17 | amorphous phase | ○ | 2.3 | 1.51 |
| 144 | Ex. | 1300 | 15 | 650 | 10 | 50 | amorphous phase | ○ | 2.9 | 1.43 |

Table 5 shows that when the initial fine crystals had an average grain size of 0.3 to 10 nm and when the Fe based nanocrystalline alloy had an average grain size of 5 to 30 nm, both saturation magnetic flux density Bs and coercivity Hc were good compared to those when these ranges were not satisfied.

Experimental Example 4

Raw material metals were weighed so that the alloy compositions of Examples and Comparative Examples shown in the following table were obtained, and the weighed raw material metals were melted by high-frequency heating. Then, base alloys were manufactured. Incidentally, Sample No. 9 and Sample No. 10 were the same as Sample No. 9 and Sample No. 10 in Experimental Example 1.

The manufactured base alloys were thereafter heated, melted, and turned into a molten metal at 1250° C. This molten metal was sprayed against a roller rotating at 25 m/sec. (single roller method), and ribbons were thereby obtained. Incidentally, the roller was made of Cu.

In Sample No. 201 and Sample No. 202, the roller was rotated in the direction shown in FIG. 2, and the roller temperature was 30° C. In Sample No. 201 and Sample No. 202, the roller rotating speed was controlled, and the ribbon to be obtained thereby had a thickness of 20 μm to 30 μm, a width of 4 mm to 5 mm, and a length of several tens of meter.

In Sample No. 203 to Sample No. 209, the roller was rotated in the direction shown in FIG. 1, and the roller temperature was 70° C. In Sample No. 203 to Sample No. 209, the ribbon to be obtained had a thickness of about 20 μm to 30 μm, a width of 4 mm to 5 mm, and a length of several tens of meter, provided that the differential pressure between the inside of the chamber and the inside of the spray nozzle was 105 kPa, that the nozzle diameter was 5 mm slit, that the flow rate was 50 g, and that the roller diameter φ was 300 mm.

Each of the obtained ribbons underwent an X-ray diffraction measurement and was confirmed if it contained crystals having a grain size of larger than 30 nm. When crystals having a grain size of larger than 30 nm did not exist, the ribbon was considered to be composed of amorphous phases. When crystals having a grain size of larger than 30 nm existed, the ribbon was considered to be composed of crystalline phases. Incidentally, all of Examples except for Sample No. 274 mentioned below had a nanohetero structure where initial fine crystals existed in amorphous phases.

After that, the ribbons of Examples and Comparative Examples underwent a heat treatment with the conditions shown in the following table. Each of the ribbons after the heat treatment was measured for resistivity, saturation magnetic flux density, coercivity, and permeability μ'. The resistivity (ρ) was measured by four probe method. The saturation magnetic flux density (Bs) was measured in a magnetic field of 1000 kA/m using a vibrating sample type magnetometer (VSM). The coercivity (Hc) was measured in a magnetic field of 5 kA/m using a DC BH tracer. The permeability μ' was measured by changing frequency using an impedance analyzer and was evaluated as a frequency when the permeability μ' became 10000 (hereinafter, also referred to as a specific frequency f). In Experimental Examples 4 to 6, a resistivity of 100 μΩcm or more was represented by ◎, a resistivity of 80 μΩcm or more and less than 100 μΩcm was represented by ○, and a resistivity of less than 80 μΩcm was x. The evaluation was higher in the order of ◎, ○, and x. The evaluation of ◎ and ○ was considered to be good. In Experimental Examples 4 to 6, a saturation magnetic flux density of 1.50 T or more was considered to be good. In Experimental Examples 4 to 6, a coercivity of 4.0 A/m or less was considered to be good. In Experimental Examples 4 to 6, the permeability μ' was considered to be good when a specific frequency f was 70 kHz or more.

Unless otherwise noted, a measurement of X-ray diffraction and an observation using a transmission electron microscope confirmed that all of Examples shown below contained Fe based nanocrystallines having an average grain size of 5 to 30 nm and having bcc crystal structure. An ICP analysis also confirmed that the alloy composition did not change before and after the heat treatment.

TABLE 6

| | | | | (Fe (1 − (a + b + c + d + e) ) MaBbPcSidCe (α = β = 0) | | | | | | | | | | |
|---|---|---|---|---|---|---|---|---|---|---|---|---|---|---|
| Sample No. | Comparative Example/ Example | roller contact distance (cm) | roller temperature (° C.) | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 201 | Comp. Ex. | 6 | 30 | 0.840 | 0.070 | 0.090 | 0.000 | 0.000 | 0.000 | amorphous phase | X | 6.3 | 1.58 | 30 |
| 202 | Comp. Ex. | 6 | 30 | 0.820 | 0.070 | 0.090 | 0.020 | 0.000 | 0.000 | amorphous phase | X | 2.4 | 1.54 | 50 |
| 203 | Comp. Ex. | 18 | 70 | 0.840 | 0.070 | 0.090 | 0.000 | 0.000 | 0.000 | amorphous phase | X | 6.1 | 1.58 | 40 |
| 204 | Comp. Ex. | 18 | 70 | 0.820 | 0.070 | 0.090 | 0.020 | 0.000 | 0.000 | amorphous phase | X | 2.3 | 1.53 | 60 |
| 205 | Comp. Ex. | 18 | 70 | 0.838 | 0.070 | 0.090 | 0.000 | 0.000 | 0.020 | amorphous phase | X | 3.1 | 1.53 | 50 |
| 206 | Ex. | 18 | 70 | 0.818 | 0.070 | 0.090 | 0.020 | 0.000 | 0.020 | amorphous phase | ○ | 1.8 | 1.56 | 80 |
| 207 | Comp. Ex. | 18 | 70 | 0.835 | 0.070 | 0.090 | 0.000 | 0.000 | 0.050 | amorphous phase | X | 2.6 | 1.46 | 60 |
| 208 | Comp. Ex. | 18 | 70 | 0.815 | 0.070 | 0.090 | 0.020 | 0.000 | 0.050 | amorphous phase | ○ | 2.7 | 1.45 | 60 |
| 209 | Comp. Ex. | 18 | 30 | 0.838 | 0.070 | 0.090 | 0.000 | 0.000 | 0.020 | amorphous phase | X | 3.3 | 1.53 | 50 |
| 9 | Comp. Ex. | 18 | 70 | 0.780 | 0.000 | 0.130 | 0.000 | 0.090 | 0.000 | amorphous phase | ◎ | 1.5 | 1.60 | 40 |
| 10 | Comp. Ex. | 18 | 70 | Co66Fe4Si17B13 | | | | | | amorphous phase | ◎ | 2.2 | 0.50 | 80 |

Table 6 shows that all characteristics were good in Sample No. 206 (each component content was in a predetermined range, and the roller contact distance and the roller temperature were controlled favorably). On the other hand, Table 6 shows that any of characteristics was bad in Sample No. 201 to Sample No. 205 and Sample No. 207 to Sample No. 209 (each component content, especially P content and/or C content, was outside a predetermined range).

Experimental Example 5

Experimental Example 5 was carried out with the same conditions as Sample No. 206 of Experimental Example 4 except that base alloys were manufactured by weighing raw material metals so that alloy compositions of Examples and Comparative Examples shown in the following tables would be obtained and by melting the raw material metals with high-frequency heating.

TABLE 7

| Sample No. | Comparative Example/ Example | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
|---|---|---|---|---|---|---|---|---|---|---|---|---|
| | | (Fe (1 − (a + b + c + d + e) ) MaBbPcSidCe (α = β = 0) | | | | | | | | | | |
| 211 | Comp. Ex. | 0.873 | 0.015 | 0.090 | 0.020 | 0.000 | 0.0020 | crystalline phase | X | 458 | 1.68 | — |
| 212 | Ex. | 0.868 | 0.020 | 0.090 | 0.020 | 0.000 | 0.0020 | amorphous phase | ○ | 3.2 | 1.66 | 70 |
| 213 | Ex. | 0.848 | 0.040 | 0.090 | 0.020 | 0.000 | 0.0020 | amorphous phase | ○ | 2.9 | 1.64 | 70 |
| 214 | Ex. | 0.838 | 0.050 | 0.090 | 0.020 | 0.000 | 0.0020 | amorphous phase | ○ | 2.3 | 1.62 | 80 |
| 215 | Ex. | 0.828 | 0.060 | 0.090 | 0.020 | 0.000 | 0.0020 | amorphous phase | ○ | 2.2 | 1.6 | 80 |
| 206 | Ex. | 0.818 | 0.070 | 0.090 | 0.020 | 0.000 | 0.0020 | amorphous phase | ○ | 1.8 | 1.56 | 80 |
| 216 | Ex. | 0.808 | 0.080 | 0.090 | 0.020 | 0.000 | 0.0020 | amorphous phase | ○ | 1.8 | 1.55 | 80 |
| 217 | Ex. | 0.788 | 0.100 | 0.090 | 0.020 | 0.000 | 0.0020 | amorphous phase | ○ | 1.9 | 1.53 | 80 |
| 218 | Ex. | 0.768 | 0.120 | 0.090 | 0.020 | 0.000 | 0.0020 | amorphous phase | ○ | 2.1 | 1.52 | 90 |
| 219 | Ex. | 0.748 | 0.140 | 0.090 | 0.020 | 0.000 | 0.0020 | amorphous phase | ○ | 2.4 | 1.5 | 90 |
| 220 | Comp. Ex. | 0.738 | 0.150 | 0.090 | 0.020 | 0.000 | 0.0020 | amorphous phase | ○ | 2.6 | 1.43 | 80 |
| 221 | Comp. Ex. | 0.888 | 0.070 | 0.020 | 0.020 | 0.000 | 0.0020 | crystalline phase | X | 678 | 1.77 | — |
| 222 | Ex. | 0.883 | 0.070 | 0.025 | 0.020 | 0.000 | 0.0020 | amorphous phase | ○ | 3.8 | 1.71 | 80 |
| 223 | Ex. | 0.848 | 0.070 | 0.060 | 0.020 | 0.000 | 0.0020 | amorphous phase | ○ | 3.3 | 1.62 | 80 |
| 224 | Ex. | 0.828 | 0.070 | 0.080 | 0.020 | 0.000 | 0.0020 | amorphous phase | ○ | 2.4 | 1.6 | 80 |
| 206 | Ex. | 0.818 | 0.070 | 0.090 | 0.020 | 0.000 | 0.0020 | amorphous phase | ○ | 1.8 | 1.56 | 80 |
| 225 | Ex. | 0.788 | 0.070 | 0.120 | 0.020 | 0.000 | 0.0020 | amorphous phase | ○ | 1.6 | 1.55 | 80 |
| 226 | Ex. | 0.758 | 0.070 | 0.150 | 0.020 | 0.000 | 0.0020 | amorphous phase | ○ | 1.8 | 1.53 | 90 |
| 227 | Ex. | 0.708 | 0.070 | 0.200 | 0.020 | 0.000 | 0.0020 | amorphous phase | ○ | 2.1 | 1.5 | 90 |
| 228 | Comp. Ex. | 0.698 | 0.070 | 0.210 | 0.020 | 0.000 | 0.0020 | amorphous phase | ○ | 2.2 | 1.48 | 80 |
| 5 | Comp. Ex. | 0.840 | 0.070 | 0.090 | 0.000 | 0.000 | 0.0000 | amorphous phase | X | 6.1 | 1.58 | 40 |
| 205 | Comp. Ex. | 0.838 | 0.070 | 0.090 | 0.000 | 0.000 | 0.0020 | amorphous phase | X | 4.8 | 1.58 | 50 |
| 229 | Ex. | 0.828 | 0.070 | 0.090 | 0.010 | 0.000 | 0.0020 | amorphous phase | ○ | 3.1 | 1.52 | 80 |

TABLE 7-continued

| Sample No. | Comparative Example/ Example | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
|---|---|---|---|---|---|---|---|---|---|---|---|---|
| | (Fe (1 − (a + b + c + d + e) ) MaBbPcSidCe (α = β = 0) | | | | | | | | | | | |
| 206 | Ex. | 0.818 | 0.070 | 0.090 | 0.020 | 0.000 | 0.0020 | amorphous phase | ○ | 1.8 | 1.56 | 80 |
| 230 | Ex. | 0.808 | 0.070 | 0.090 | 0.030 | 0.000 | 0.0020 | amorphous phase | ○ | 2.5 | 1.52 | 80 |
| 231 | Ex. | 0.798 | 0.070 | 0.090 | 0.040 | 0.000 | 0.0020 | amorphous phase | ○ | 3.1 | 1.52 | 80 |
| 5 | Comp. Ex. | 0.840 | 0.070 | 0.090 | 0.000 | 0.000 | 0.0000 | amorphous phase | X | 6.1 | 1.58 | 40 |
| 232 | Comp. Ex. | 0.830 | 0.070 | 0.090 | 0.010 | 0.000 | 0.0000 | amorphous phase | X | 4.2 | 1.55 | 60 |
| 233 | Ex. | 0.829 | 0.070 | 0.090 | 0.010 | 0.000 | 0.0006 | amorphous phase | ○ | 3.8 | 1.54 | 80 |
| 234 | Ex. | 0.828 | 0.070 | 0.090 | 0.010 | 0.000 | 0.0020 | amorphous phase | ○ | 3.1 | 1.52 | 80 |
| 235 | Ex. | 0.826 | 0.070 | 0.090 | 0.010 | 0.000 | 0.0045 | amorphous phase | ○ | 2.8 | 1.51 | 80 |
| 236 | Comp. Ex. | 0.825 | 0.070 | 0.090 | 0.010 | 0.000 | 0.0050 | amorphous phase | ○ | 2.5 | 1.45 | 60 |
| 5 | Comp. Ex. | 0.840 | 0.070 | 0.090 | 0.000 | 0.000 | 0.0000 | amorphous phase | X | 6.1 | 1.58 | 40 |
| 6 | Comp. Ex. | 0.820 | 0.070 | 0.090 | 0.020 | 0.000 | 0.0000 | amorphous phase | X | 2.3 | 1.53 | 60 |
| 237 | Ex. | 0.819 | 0.070 | 0.090 | 0.020 | 0.000 | 0.0006 | amorphous phase | ○ | 2.1 | 1.53 | 80 |
| 206 | Ex. | 0.818 | 0.070 | 0.090 | 0.020 | 0.000 | 0.0020 | amorphous phase | ○ | 1.8 | 1.56 | 80 |
| 238 | Ex. | 0.816 | 0.070 | 0.090 | 0.020 | 0.000 | 0.0045 | amorphous phase | ○ | 1.7 | 1.56 | 90 |
| 208 | Comp. Ex. | 0.815 | 0.070 | 0.090 | 0.020 | 0.000 | 0.0050 | amorphous phase | ○ | 2.7 | 1.45 | 60 |
| 5 | Comp. Ex. | 0.840 | 0.070 | 0.090 | 0.000 | 0.000 | 0.0000 | amorphous phase | X | 6.1 | 1.58 | 40 |
| 239 | Comp. Ex. | 0.810 | 0.070 | 0.090 | 0.030 | 0.000 | 0.0000 | amorphous phase | X | 2.7 | 1.53 | 60 |
| 240 | Ex. | 0.809 | 0.070 | 0.090 | 0.030 | 0.000 | 0.0006 | amorphous phase | ○ | 2.6 | 1.54 | 70 |
| 241 | Ex. | 0.808 | 0.070 | 0.090 | 0.030 | 0.000 | 0.0020 | amorphous phase | ○ | 2.5 | 1.52 | 80 |
| 242 | Ex. | 0.806 | 0.070 | 0.090 | 0.030 | 0.000 | 0.0045 | amorphous phase | ○ | 2.3 | 1.51 | 80 |
| 243 | Comp. Ex. | 0.805 | 0.070 | 0.090 | 0.030 | 0.000 | 0.0050 | amorphous phase | ○ | 2.5 | 1.45 | 70 |
| 5 | Comp. Ex. | 0.840 | 0.070 | 0.090 | 0.000 | 0.000 | 0.0000 | amorphous phase | X | 6.1 | 1.58 | 40 |
| 244 | Comp. Ex. | 0.800 | 0.070 | 0.090 | 0.040 | 0.000 | 0.0000 | amorphous phase | X | 3.3 | 1.55 | 90 |

TABLE 7-continued

| | | (Fe (1 − (a + b + c + d + e) ) MaBbPcSidCe (α = β = 0) | | | | | | | | | | |
|---|---|---|---|---|---|---|---|---|---|---|---|---|
| Sample No. | Comparative Example/ Example | Fe | M(Nb) a | B b | P c | Si d | C e | XRD | resistivity ρ (μ Ω cm) | coercivity Hc (A/m) | saturation magnetic flux density Bs (T) | specific frequency f (kHz) |
| 245 | Ex. | 0.799 | 0.070 | 0.090 | 0.040 | 0.000 | 0.0006 | amorphous phase | ○ | 3.8 | 1.53 | 70 |
| 246 | Ex. | 0.798 | 0.070 | 0.090 | 0.040 | 0.000 | 0.0020 | amorphous phase | ○ | 3.1 | 1.52 | 80 |
| 247 | Ex. | 0.796 | 0.070 | 0.090 | 0.040 | 0.000 | 0.0045 | amorphous phase | ○ | 2.8 | 1.51 | 80 |
| 248 | Comp. Ex. | 0.795 | 0.070 | 0.090 | 0.040 | 0.000 | 0.0050 | amorphous phase | ○ | 2.5 | 1.42 | 70 |
| 206 | Ex. | 0.818 | 0.070 | 0.090 | 0.020 | 0.000 | 0.0020 | amorphous phase | ○ | 1.8 | 1.56 | 80 |
| 249 | Ex. | 0.798 | 0.070 | 0.090 | 0.020 | 0.020 | 0.0020 | amorphous phase | ◎ | 2.4 | 1.54 | 80 |
| 250 | Ex. | 0.778 | 0.070 | 0.090 | 0.020 | 0.040 | 0.0020 | amorphous phase | ◎ | 2.5 | 1.56 | 90 |
| 251 | Ex. | 0.758 | 0.070 | 0.090 | 0.020 | 0.060 | 0.0020 | amorphous phase | ◎ | 2.4 | 1.51 | 90 |
| 252 | Comp. Ex. | 0.738 | 0.070 | 0.090 | 0.020 | 0.080 | 0.0020 | amorphous phase | ○ | 2.7 | 1.42 | 70 |

TABLE 8

| | | Fe (1 − (a + b + c + d + e) ) MaBbPcSidCe (α = β = 0, b to e are the same as those of Sample No. 206) | | | | | | |
|---|---|---|---|---|---|---|---|---|
| Sample | Comparative Example/ | M | | | resistivity ρ | coercivity Hc | saturation magnetic flux density Bs | specific frequency f |
| No. | Example | type | a | XRD | (μ Ω cm) | (A/m) | (T) | (kHz) |
| 206 | Ex. | Nb | 0.070 | amorphous phase | ○ | 1.8 | 1.56 | 80 |
| 253 | Ex. | Hf | 0.070 | amorphous phase | ○ | 1.8 | 1.55 | 80 |
| 254 | Ex. | Zr | 0.070 | amorphous phase | ○ | 1.9 | 1.52 | 80 |
| 255 | Ex. | Ta | 0.070 | amorphous phase | ○ | 2.4 | 1.51 | 70 |
| 256 | Ex. | Mo | 0.070 | amorphous phase | ○ | 2.4 | 1.51 | 80 |
| 257 | Ex. | W | 0.070 | amorphous phase | ○ | 2.3 | 1.51 | 90 |
| 258 | Ex. | V | 0.070 | amorphous phase | ○ | 2.4 | 1.52 | 80 |
| 259 | Ex. | Nb0.5Hf0.5 | 0.070 | amorphous phase | ○ | 2.1 | 1.52 | 90 |
| 260 | Ex. | Zr0.5Ta0.5 | 0.070 | amorphous phase | ○ | 2.3 | 1.53 | 90 |
| 261 | Ex. | Nb0.4Hf0.3Zr0.3 | 0.070 | amorphous phase | ○ | 2.1 | 1.51 | 90 |

TABLE 9

| Sample No. | Comparative Example/ Example | X1 type | X1 α\|1 − (a + b + c + d + e)\| | X2 type | X2 β\|1 − (a + b + c + d + e)\| | ribbon thickness (μm) | XRD | resistivity ρ (μ Ω cm) | coercivity Hc (A/m) | saturation magnetic flux density Bs (T) | specific frequency f (kHz) |
|---|---|---|---|---|---|---|---|---|---|---|---|
| | | Fe (1 − (α + β)) X1αX2β (a to e are the same as those of Sample No. 206) | | | | | | | | | |
| 206 | Ex. | — | 0.000 | — | 0.000 | 21 | amorphous phase | ○ | 1.8 | 1.56 | 80 |
| 262 | Ex. | Co | 0.100 | — | 0.000 | 20 | amorphous phase | ○ | 2.4 | 1.56 | 80 |
| 263 | Ex. | Co | 0.400 | — | 0.000 | 22 | amorphous phase | ○ | 2.8 | 1.58 | 80 |
| 264 | Ex. | Ni | 0.100 | — | 0.000 | 23 | amorphous phase | ○ | 2.1 | 1.54 | 80 |
| 265 | Ex. | Ni | 0.400 | — | 0.000 | 23 | amorphous phase | ○ | 2.4 | 1.53 | 80 |
| 266 | Ex. | — | 0.000 | Al | 0.010 | 21 | amorphous phase | ◎ | 2.1 | 1.53 | 90 |
| 267 | Ex. | — | 0.000 | Zn | 0.010 | 20 | amorphous phase | ◎ | 2.3 | 1.53 | 90 |
| 268 | Ex. | — | 0.000 | Sn | 0.010 | 21 | amorphous phase | ◎ | 2.3 | 1.54 | 80 |
| 269 | Ex. | — | 0.000 | Cu | 0.010 | 22 | amorphous phase | ◎ | 2.3 | 1.53 | 90 |
| 271 | Ex. | — | 0.000 | Bi | 0.010 | 21 | amorphous phase | ◎ | 2.6 | 1.51 | 90 |
| 272 | Ex. | — | 0.000 | La | 0.010 | 20 | amorphous phase | ◎ | 2.7 | 1.52 | 80 |
| 273 | Ex. | — | 0.000 | Y | 0.010 | 23 | amorphous phase | ◎ | 2.6 | 1.51 | 70 |
| 273-2 | Ex. | — | 0.000 | Mn | 0.010 | 22 | amorphous phase | ◎ | 2.4 | 1.52 | 90 |
| 273-3 | Ex. | — | 0.000 | Ag | 0.010 | 21 | amorphous phase | ◎ | 2.3 | 1.51 | 90 |
| 273-4 | Ex. | — | 0.000 | As | 0.010 | 21 | amorphous phase | ◎ | 2.4 | 1.52 | 90 |
| 273-5 | Ex. | — | 0.000 | Sb | 0.010 | 20 | amorphous phase | ◎ | 2.4 | 1.50 | 90 |
| 273-6 | Ex. | — | 0.000 | O | 0.010 | 19 | amorphous phase | ◎ | 2.3 | 1.52 | 90 |
| 273-7 | Ex. | — | 0.000 | N | 0.010 | 19 | amorphous phase | ◎ | 2.4 | 1.51 | 90 |

Table 7 shows Examples whose M content (a), B content (b), P content (c), Si content (d), and C content (e) were changed. Incidentally, the type of M was Nb. Examples whose each component content was in a predetermined range had a good resistivity ρ, a good saturation magnetic flux density Bs, a good coercivity Hc, and a good permeability μ'.

In Sample No. 211 (M content (a) was too small), the ribbon before the heat treatment was composed of crystalline phases and had a small resistivity ρ, a significantly large coercivity Hc, a significantly small permeability μ', and no specific frequency f after the heat treatment. Sample No. 220 (M content (a) was too large) had a low saturation magnetic flux density Bs.

In Sample No. 221 (B content (a) was too small), the ribbon before the heat treatment was composed of crystalline phases and had a small resistivity ρ, a significantly large coercivity Hc, a significantly small permeability μ', and no specific frequency f after the heat treatment. Sample No. 228 (B content (a) was too large) had a low saturation magnetic flux density Bs.

A comparative example containing no P (c=0) and a comparative example containing no C (e=0) tended to have a small resistivity ρ, a large coercivity Hc, a small permeability μ', and a small specific frequency f after the heat treatment. A comparative example whose C content (e=0) was too large tended to have a low saturation magnetic flux density Bs, a low permeability μ', and a low specific frequency f.

Sample No. 252 (Si content (d) was too large) had a large saturation magnetic flux density.

Table 8 shows Examples whose M type in Sample No. 206 was changed.

Table 8 shows that excellent characteristics were exhibited even if the type of M was changed.

Table 9 shows Examples where a part of Fe in Sample No. 206 was substituted by X1 and/or X2.

Table 9 shows that excellent characteristics were exhibited even if a part of Fe was substituted by X1 and/or X2.

Among the samples shown in FIG. 9, it was confirmed that a sample where a part of Fe was substituted by X2 easily had a soft magnetic alloy containing no crystalline phases composed of crystals having a grain size of larger than 30 nm (a soft magnetic alloy according to the second aspect of the present invention). To facilitate generation of crystalline phases composed of crystals having a grain size of larger than 30 nm, the ribbon to be obtained specifically was controlled to have a thickness of about 40 μm to 50 μm. Table 10 shows the results.

TABLE 10

Fe (1 − (α + β)) X1αX2β (a to e are the same as those of Sample No. 206)

| Sample No. | Comparative Example/ Example | X1 type | X1 α\|1 − (a + b + c + d + e)\| | X2 type | X2 β\|1 − (a + b + c + d + e)\| | ribbon thickness (μm) | XRD | resistivity ρ (μ Ω cm) | coercivity Hc (A/m) | saturation magnetic flux density Bs (T) |
|---|---|---|---|---|---|---|---|---|---|---|
| 206a | Ex. | — | 0.000 | — | 0.000 | 39 | amorphous phase | ○ | 1.8 | 1.56 |
| 266a | Ex. | — | 0.000 | Al | 0.010 | 41 | amorphous phase | ◎ | 2.2 | 1.53 |
| 267a | Ex. | — | 0.000 | Zn | 0.010 | 42 | amorphous phase | ◎ | 2.1 | 1.53 |
| 268a | Ex. | — | 0.000 | Sn | 0.010 | 44 | amorphous phase | ◎ | 2.3 | 1.54 |
| 269a | Ex. | — | 0.000 | Cu | 0.010 | 43 | amorphous phase | ◎ | 2.3 | 1.53 |
| 271a | Ex. | — | 0.000 | Bi | 0.010 | 41 | amorphous phase | ◎ | 2.5 | 1.51 |
| 272a | Ex. | — | 0.000 | La | 0.010 | 44 | amorphous phase | ◎ | 2.6 | 1.52 |
| 273a | Ex. | — | 0.000 | Y | 0.010 | 42 | amorphous phase | ◎ | 2.4 | 1.51 |
| 273-2a | Ex. | — | 0.000 | Mn | 0.010 | 43 | amorphous phase | ◎ | 2.4 | 1.52 |
| 273-3a | Ex. | — | 0.000 | Ag | 0.010 | 41 | amorphous phase | ◎ | 2.2 | 1.51 |
| 273-4a | Ex. | — | 0.000 | As | 0.010 | 40 | amorphous phase | ◎ | 2.4 | 1.52 |
| 273-5a | Ex. | — | 0.000 | Sb | 0.010 | 41 | amorphous phase | ◎ | 2.4 | 1.50 |
| 273-6a | Ex. | — | 0.000 | O | 0.010 | 42 | amorphous phase | ◎ | 2.1 | 1.52 |
| 273-7a | Ex. | — | 0.000 | N | 0.010 | 40 | amorphous phase | ◎ | 2.5 | 1.51 |

Table 10 shows that a soft magnetic alloy containing no crystalline phases composed of crystals having a grain size of larger than 30 nm was obtained in each sample of Table 9 even if the ribbon to be obtained had a thickness of about 40 μm to 50 μm.

Experimental Example 6

In Experimental Example 6, the average grain size of the initial fine crystals and the average grain size of the Fe based nanocrystalline alloy in Sample No. 206 were changed by appropriately changing the temperature of molten metal and the heat-treatment conditions after the ribbon was manufactured. Table 11 shows the results. Incidentally, all samples shown in Table 11 had a good permeability μ'.

TABLE 11

Fe (1 − (a + b + c + d + e) ) MaBbPcSidCe (a to e are the same as those of Sample No. 206)

| Sample No. | Comparative Example/ Example | metal temperature (° C.) | average grain size of initial fine crystals (nm) | heat treatment temperature (° C.) | heat treatment time (h.) | average grain size of Fe based nanocrystalline alloy (nm) | XRD | ρ (μ Ω cm) | Hc (A/m) | Bs (T) |
|---|---|---|---|---|---|---|---|---|---|---|
| 274 | Ex. | 1200 | no initial fine crystals | 800 | 1 | 10 | amorphous phase | ○ | 2.0 | 1.56 |
| 275 | Ex. | 1225 | 0.1 | 450 | 1 | 3 | amorphous phase | ○ | 2.4 | 1.52 |
| 276 | Ex. | 1250 | 0.3 | 500 | 1 | 5 | amorphous phase | ○ | 2.1 | 1.52 |

TABLE 11-continued

| | | Fe (1 − (a + b + c + d + e) ) MaBbPcSidCe (a to e are the same as those of Sample No. 206) | | | | | | | | |
|---|---|---|---|---|---|---|---|---|---|---|
| Sample No. | Comparative Example/ Example | metal temperature (° C.) | average grain size of initial fine crystals (nm) | heat treatment temperature (° C.) | heat treatment time (h.) | average grain size of Fe based nanocrystalline alloy (nm) | XRD | ρ (μ Ω cm) | Hc (A/m) | Bs (T) |
| 277 | Ex. | 1250 | 0.3 | 550 | 1 | 10 | amorphous phase | ○ | 2.2 | 1.51 |
| 278 | Ex. | 1250 | 0.3 | 575 | 1 | 13 | amorphous phase | ○ | 2.1 | 1.54 |
| 206 | Ex. | 1250 | 0.3 | 600 | 1 | 10 | amorphous phase | ○ | 1.8 | 1.56 |
| 279 | Ex. | 1275 | 10 | 600 | 1 | 12 | amorphous phase | ○ | 1.8 | 1.54 |
| 280 | Ex. | 1275 | 10 | 650 | 1 | 30 | amorphous phase | ○ | 2.1 | 1.52 |
| 281 | Ex. | 1300 | 15 | 600 | 1 | 17 | amorphous phase | ○ | 3.1 | 1.52 |
| 282 | Ex. | 1300 | 15 | 650 | 10 | 50 | amorphous phase | ○ | 3.2 | 1.51 |

Table 11 shows that when the initial fine crystals had an average grain size of 0.3 to 10 nm and when the Fe based nanocrystalline alloy had an average grain size of 5 to 30 nm, both saturation magnetic flux density Bs and coercivity Hc were good compared to those when these ranges were not satisfied.

NUMERICAL REFERENCES

21, 31 . . . nozzle
22, 32 . . . molten metal
23, 33 . . . roller
24, 34 . . . ribbon
25, 35 . . . chamber
26 . . . peel gas spray device

What is claimed is:

1. A soft magnetic alloy comprising a main component of $(Fe_{(1-(\alpha+\beta))}X1_{\alpha}X2_{\beta})_{(1-(a+b+c+d+e))}M_aB_bP_cSi_dC_e$, by atomic fraction, in which X1 is one or more of Co and Ni, X2 is one or more of Al, Mn, Ag, Zn, Sn, As, Sb, Cr, Bi, N, O, and rare earth elements, M is Nb, $0.050 \le a \le 0.140$ is satisfied, $0.020 < b \le 0.20$ is satisfied, $0.020 \le c \le 0.030$ is satisfied, $0 \le d \le 0.060$ is satisfied, $0.0006 \le e \le 0.0045$ is satisfied, $\alpha \ge 0$ is satisfied, $\beta \ge 0$ is satisfied, and $0 \le \alpha+\beta \le 0.50$ is satisfied, wherein the soft magnetic alloy has a structure of Fe based nanocrystallines.

2. A soft magnetic alloy according to claim 1, wherein the Fe based nanocrystallines have an average grain size of 5 to 30 nm.

3. A magnetic device comprising the soft magnetic alloy according to claim 1.

* * * * *